United States Patent [19]
Wala

[11] Patent Number: 6,112,086
[45] Date of Patent: Aug. 29, 2000

[54] SCANNING RSSI RECEIVER SYSTEM USING INVERSE FAST FOURIER TRANSFORMS FOR A CELLULAR COMMUNICATIONS SYSTEM WITH CENTRALIZED BASE STATIONS AND DISTRIBUTED ANTENNA UNITS

[75] Inventor: Philip M. Wala, Waseca, Minn.

[73] Assignee: ADC Telecommunications, Inc., Minnetonka, Minn.

[21] Appl. No.: 08/805,802

[22] Filed: Feb. 25, 1997

[51] Int. Cl.[7] .............................. H04Q 7/20; H04Q 7/00
[52] U.S. Cl. ...................... 455/434; 455/438; 455/32.1
[58] Field of Search .................... 455/32.1, 434, 455/561, 161.3, 438, 443

[56] References Cited

U.S. PATENT DOCUMENTS

| | | | |
|---|---|---|---|
| 4,144,409 | 3/1979 | Utano et al. ............................ | 179/2 |
| 4,144,411 | 3/1979 | Frenkiel ................................ | 179/2 EB |
| 4,231,116 | 10/1980 | Sekiguchi et al. ..................... | 455/87 |
| 4,451,699 | 5/1984 | Gruenberg ............................. | 179/2 EB |
| 4,456,793 | 6/1984 | Baker et al. ............................ | 179/99 R |

(List continued on next page.)

FOREIGN PATENT DOCUMENTS

| | | | |
|---|---|---|---|
| 2008900 | 10/1990 | Canada ............................ | H04J 14/02 |
| 0166885 | 1/1986 | European Pat. Off. .......... | H04Q 7/04 |
| 0346925 | 12/1989 | European Pat. Off. .......... | H04B 9/00 |
| 0368673 | 5/1990 | European Pat. Off. .......... | H04Q 7/04 |
| 0391597 | 10/1990 | European Pat. Off. .......... | H04Q 7/04 |
| 0468688 | 1/1992 | European Pat. Off. .......... | H04B 7/26 |
| 2345865 | 3/1977 | France ............................. | H04B 7/26 |
| 326031 | 2/1991 | Japan .............................. | H04B 7/26 |
| 58-164007 | 6/1983 | United Kingdom .............. | G11B 5/06 |

OTHER PUBLICATIONS

"ADC Kentrox CityCell Field Trial Yields Another First: Simultaneous Analog and Digital Calls", *The Day Group,* 2 Greenwich Plaza, Greenwich, CT.

"ADC Kentrox Introduces CITYCELL 824, a Replacement for Conventional Cell Sites; Company' Original Goal was to Improve Fiber Optic T1 Links Between Cells, MTSOs", *ADC Telocator Bulletin,* (Feb., 1993).

"ADC Kentrox Introduces Innovative Wireless Network Access Solution: Cellular Subscribers Offered a New Level of Portable Service", *ADC Kentrox New Release,* 1–3, (Mar. 1, 1993).

"ADC Kentrox Wireless System Group CityCell", *CITA Trade Show,* A positioning whte paper, (Mar. 1993).

"And now a few words from your Customers . . . ", *ADC Kentrox Product Brochure,* (Aug. 1992).

"Broadband Optical Transport Digital Microcell Connection Service–Interface and Performance Specifications. Interface and Performance Specifications. A technical description of the User–Network Interface and performance specification for Amaurotic Digital Microcell Connection Service", *AM TR–NIS–000117, Issue, 1,* Ameritech Document, 1–26, (Dec. 1993).

"Digital Transport for Cellular", *Microwaves & RF,* (Feb. 1993).

"First Field Trial Results Exceed Expectations—ADC Kentrox and Cellular One Join Force to Provide a New Level of Portable Service", *ADC Kentrox News release,* (Mar. 2, 1993).

(List continued on next page.)

*Primary Examiner*—Fan S. Tsang
*Assistant Examiner*—Sheila Smith
*Attorney, Agent, or Firm*—Schwegman, Lundberg, Woessner & Kluth, P.A.

[57] ABSTRACT

A microcellular communications network includes a plurality of base station units and corresponding antenna units. The microcells connected to their respective base station units over a telephone system. The microcells providing received signal strength indication (RSSI) level signals and Supervisory Audio Tone (SAT) frequencies to the base station for hand-in evaluation. The base stations having a scanning receiver for processing the RSSI level signals and SAT frequencies and for performing hand-in for neighboring cells.

24 Claims, 16 Drawing Sheets

6,112,086

Page 2

U.S. PATENT DOCUMENTS

| | | | |
|---|---|---|---|
| 4,475,010 | 10/1984 | Huensch et al. | 179/2 EB |
| 4,485,486 | 11/1984 | Webb et al. | 455/33 |
| 4,525,861 | 6/1985 | Freeburg | 455/33 |
| 4,556,760 | 12/1985 | Goldman | 179/2 EB |
| 4,613,990 | 9/1986 | Halpern | 455/33 |
| 4,669,107 | 5/1987 | Eriksson-Lennartsson | 379/60 |
| 4,704,734 | 11/1987 | Menich et al. | 455/33 |
| 4,718,004 | 1/1988 | Dalal | 364/200 |
| 4,726,050 | 2/1988 | Menich et al. | 379/60 |
| 4,759,051 | 7/1988 | Han | 379/59 |
| 4,790,000 | 12/1988 | Kinoshita | 379/59 |
| 4,797,947 | 1/1989 | Labedz | 455/33 |
| 4,831,662 | 5/1989 | Kuhn | 455/608 |
| 4,916,460 | 4/1990 | Powell | 343/853 |
| 4,932,049 | 6/1990 | Lee | 379/60 |
| 5,067,147 | 11/1991 | Lee | 379/60 |
| 5,067,173 | 11/1991 | Gordon et al. | 359/152 |
| 5,084,869 | 1/1992 | Russell | 370/85.7 |
| 5,159,479 | 10/1992 | Takagi | 359/174 |
| 5,175,867 | 12/1992 | Wejke et al. | 455/33.1 |
| 5,185,738 | 2/1993 | Kelly | 370/95.1 |
| 5,193,109 | 3/1993 | Lee | 379/60 |
| 5,199,109 | 3/1993 | Baker | 455/161.2 |
| 5,243,598 | 9/1993 | Lee | 370/95.3 |
| 5,251,053 | 10/1993 | Heidemann | 358/145 |
| 5,267,261 | 11/1993 | Blakeney, II et al. | 375/1 |
| 5,278,690 | 1/1994 | Vella-Coleiro | 359/152 |
| 5,280,472 | 1/1994 | Gilhousen et al. | 370/18 |
| 5,285,469 | 2/1994 | Vanderpool | 375/1 |
| 5,297,193 | 3/1994 | Bouix et al. | 379/63 |
| 5,301,056 | 4/1994 | O'Neill | 359/145 |
| 5,303,287 | 4/1994 | Laborde | 379/59 |
| 5,305,308 | 4/1994 | English et al. | 370/32.1 |
| 5,309,474 | 5/1994 | Gilhousen et al. | 375/1 |
| 5,339,184 | 8/1994 | Tang | 359/124 |
| 5,355,401 | 10/1994 | Skinner, Sr. | 379/56 |
| 5,381,459 | 1/1995 | Lappington | 379/56 |
| 5,392,453 | 2/1995 | Gudmundson et al. | 455/33.2 |
| 5,440,335 | 8/1995 | Beveridge | 348/13 |
| 5,450,473 | 9/1995 | Shiotsuki et al. | 379/60 |
| 5,822,686 | 10/1998 | Lundberg et al. | 455/161.3 |

OTHER PUBLICATIONS

"New Signal Transport Technology Digitizes The Cellular Band", *Cellular Industry, The Day Group*, 2 Greenwich Plaza, Greenwich, CT, 2–3.

"Offshore Markets Gain in Size, competitiveness, Even the smallest industry companies are expanding their global business, despite such costly distractions as ISO 9000", *Microwaves & RF*, (Mar. 1993).

"Urban Microcell System Layout", GTE Laboratories Conference, (Jun. 14–18, 1992).

"Zone Master—Maximum coverage for High–Capacity Locations.", *Decibel Multi Media MicroCELL Systems*.

Cox, D.C., "A Radio System Proposal for Widespread Low–Power Tetherless Communication", *IEEE Transactions on Communications*, 39, 324–335, (Feb. 1991).

Gupta, S.C., et al., "Land Mobile Radio Systems—A Tutorial Exposition", *IEEE Communications Magazine*, 23, 34–45, (Jun. 1985).

Kobb, B.Z., "Personal Wireless", *IEEE Spectrum Special Report/Communications*, 20–25, (Jun. 1993).

Lee, W., et al., "Intelligent Microcell Applications in PCS", 43rd IEEE Vehicular Technology Conference, Secaucus, NJ, 722–725, (May 18–20, 1993).

Merrett, R.P., et al., "A Cordless Access System Using Radio–Over–Fibre Techniques", *41st IEEE Vehicular Technology Conference*, St. Louis, MO, 921–924, (May 19–22, 1991).

O'Byrne, V., "TDMA and CDMA in a Fiber–Optic Environment", Vehicular Technology Society 42nd VTS Conference, Denver, CO, 727–731, (May 10–13, 1992).

Russell, D., "New Microcell Technology Sets Cellular Carriers Free", *Telephony*, (Mar. 1993).

Steele, R., "Towards a High–Capacity Digital Cellular Mobile Radio System", IEE Proceedings, 132, 405–415, (Aug. 1995).

Tang, d.D., "Fiber Optic Antenna R emoting for Multi–Sector Cellular Cell Sites",*GTE Laboratories Abstract*, 1–25, (Jun. 14–18, 1992).

Titch, S., "Kentrox Boosts Coverage and Capacity", *Telephony*, (Jan. 25, 1993).

Wala, P.M., "A New Microcell Architecture Using Digital Optical Transport", 43rd IEEE Vehicular Technology Conference, Secaucus, NJ, 585–588, (May 18–20, 1993).

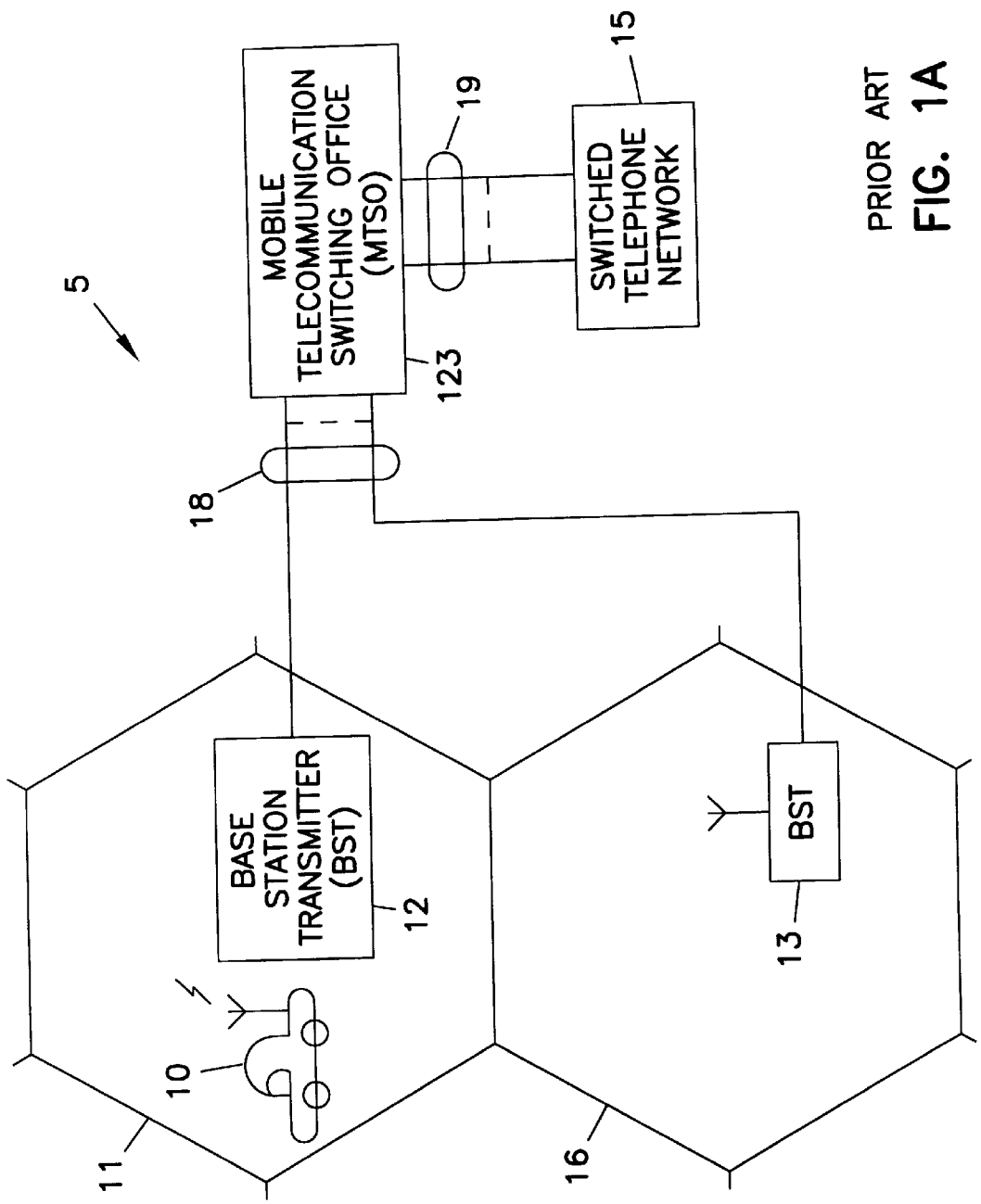

SCANNING RSSI RECEIVER SYSTEM USING INVERSE FAST FOURIER TRANSFORMS FOR A CELLULAR COMMUNICATIONS SYSTEM WITH CENTRALIZED BASE STATIONS AND DISTRIBUTED ANTENNA UNITS

FIELD OF THE INVENTION

This invention relates generally to high capacity mobile communications systems, and more particularly to digital transport of radio frequency signals in a microcellular communication system.

BACKGROUND

A conventional cellular phone system 5 is shown in FIG. 1A. Such systems are currently in widespread use in the United States. As illustrated in FIG. 1A, system 5 has a fixed number of channel sets distributed among the base stations 12, 13 serving a plurality of cells 11, 16 arranged in a predetermined reusable pattern. Typical cell areas range from 1 to 300 square miles. The larger cells typically cover rural areas and smaller cells cover urban areas. Cell antenna sites utilizing the same channel sets are spaced by a sufficient distance to assure that co-channel interference is held to an acceptably low level.

A mobile unit 10 in a cell 11 has radio telephone transceiver equipment which communicates with similar equipment in base station sites 12, 13 as the unit moves from cell to cell. Each base station 12, 13 relays telephone signals between mobile units 10 and a mobile telecommunications switching office (MTSO) 17 by way of communication lines 18. The lines 18 between a cell site and the MTSO 17, typically T1 lines, carry separate voice grade circuits for each radio channel equipped at the cell site, and data circuits for switching and other control functions. The MTSO 17 is also connected through paths 19 to a switched telephone network 15 including fixed subscriber telephone stations as well as various telephone switching offices.

MTSO 17 in FIG. 1A includes a switching network for establishing call connections between the public switched telephone network 15 and mobile units 10 located in cell sites 11, 16, and for switching call connections from one cell site to another. In addition, the MTSO 17 includes a dual access feeder for use in switching a call connection from one cell site to another. Various handoff criteria are known in the art and utilize features such as phase ranging to indicate the distance of a mobile unit from a receiving cell site, triangulation, and received signal strength to indicate the potential desirability of a handoff. Also included in the MTSO 17 is a central processing unit for processing data received from the cell sites and supervisory signals obtained from the network 15 to control the operation of setting up and taking down call connections.

A conventional base station 12 is illustrated in FIG. 1B. A radio controller unit 22 provides the interface between the T1 lines from the MTSO and the base station radio equipment. Transmitters 23, one for each channel serviced by the base station, are driven by circuit 22, which supplies each transmitter with an analog voice signal. Next, the signals are passed to a separate nonlinear power amplifier for each channel, or the signals may be combined and applied to a single linear power amplifier 24 as shown in FIG. 1B. The output of power amplifier 24 is applied through duplexer 25 to antenna 26, to be broadcast into the cellular area serviced by the base station.

Signals received in antenna 26 are applied through duplexer 25 to multi-coupler 27. Multi-coupler 27 applies the wideband signal to receivers 28 (one for each channel), and scanning receiver 28b. The analog voice signal outputs of receivers 28 are applied to circuit 22. Base station 20 may optionally include a diversity antenna 26', corresponding diversity filter 25', multi-coupler 27', and a plurality of diversity receivers 28', one for each associated main receiver 28. Where implemented, the outputs of diversity receivers 28' are applied to circuit 22, which would thus include circuitry for selecting the strongest signal as between corresponding receivers 28 and 28' using known techniques. Scanning receiver 28b monitors the strength of signals in neighboring cells to identify mobiles which are potential candidates for being handed into its own cell.

In densely populated urban areas, the capacity of a conventional system 5 is severely limited by the relatively small number of channels available in each cell 11, 16. Moreover, the coverage of urban cellular phone systems is limited by blockage, attenuation and shadowing of the RF signals by high rises and other structures. This can also be a problem with respect to suburban office buildings and complexes.

To increase capacity and coverage, a cell area can be subdivided and assigned frequencies reused in closer proximities at lower power levels. Subdivision can be accomplished by dividing the geographic territory of a cell, or for example by assigning cells to buildings or floors within a building. While such "microcell" systems are a viable solution to capacity and coverage problems, it can be difficult to find space at a reasonable cost to install conventional base station equipment in each microcell, especially in densely populated urban areas. Furthermore, maintaining a large number of base stations spread throughout a densely populated urban area can be time consuming and uneconomical.

AT&T has proposed a system to solve the problem of coverage in urban areas without having to deploy a large number of conventional base stations. The system is shown and described with respect to FIG. 1 of AT&T's European Patent Application No. 0 391 597, published on Oct. 10, 1990. In that system a grid of antennas sites 40 is placed throughout the microcellular system. An optical fiber network 42 interconnects the antennas with the base station 44. Optical wavelength carriers are analog modulated with RF mobile radio channels for transmission through the optical fiber network 26 to the antennas sites 22. A detector circuit 27 is provided for each antenna site 22 to receive the modulated carrier and reconstruct an RF signal to be applied to the antenna sites 22, for transmission into the microcell area 21. RF signals received at antenna sites 22 from mobile units are likewise modulated onto a fiber and transmitted back through optical fiber network 26 to base station 25. All of the channels transmitted from base station 25 are distributed to all antenna sites 22. Also, all the channels transmitted from the base station 25 can be received from the mobile units in any microcell 21 and transmitted via optical fiber to base station 25.

The above-described AT&T system has certain limitations. The ability to analog modulate and demodulate light, the limitations imposed by line reflections, and path loss on the fiber all introduce significant distortion and errors into an analog modulated signal and therefore limit the dynamic range of the signals which can be effectively carried via an analog system, especially in the uplink direction. These factors limit the distance from the base station to the antenna sites.

Moreover, in amplitude modulated optical systems an out-of-band signal is required to transmit control and alarm information to and from the antenna sites, again adding to the expense of the modulation and demodulation equipment.

The problems associated with analog optical modulation are addressed in a system described in pending U.S. patent application Ser. No. 08/204,660. In this system, a composite RF signal occupying the entire 12.5 MHz cellular band is sampled and digitized by a wideband digitizer at a rate greater than twice the bandwidth of the composite signal (in this case the sample rate is 30.72 MHz). The digitized signal is transported serially at 552.96 Mbps to a remote site over an optical fiber using digital optical modulation. The digitized signal is then converted back into a replica of the composite RF signal at the remote site, and amplified for retransmission. The reverse path composite signal is digitized and transported similarly in the opposite direction over the same fiber using wavelength division multiplexing. Because the optical modulation is digital, there is no loss of dynamic range over the fiber.

Both the AT&T analog system and the wideband digital system (described in the previous paragraph) teach the use of dedicated fiber lines installed for each remote antenna site. Alternatives to dedicated fiber lines, including existing telephone circuits, are typically designed to carry data streams much slower than 552.96 Mbps and the installation of additional or higher bandwidth fiber systems is an expensive and time consuming undertaking.

The data transferred over the dedicated fiber lines could be compressed by demodulating each channel, transmitting the demodulated signal, and remodulating the signals at the receiving end. Such a system would achieve transmission in the limited bandwidth, however, such a compression would not be transparent in the system, since a scanning receiver would be deprived of the necessary signals to perform hand in.

There is a need in the art for a cellular communication system which provides a scanning receiver channel data and hand in data using limited bandwidth transmission lines. The cellular communication system should employ existing telephone circuits and provide the scanning receiver the necessary hand in information without an excessive burden on the transport bit rate and without adding unnecessary complexity to the system hardware. The cellular communication system should also provide transparent operation of the existing scanning receiver to prevent redundancy in receiver hardware.

SUMMARY OF THE INVENTION

According to one exemplary embodiment of the present invention, there is provided a microcell system wherein a plurality of commonly located microcell base station units communicate with a corresponding plurality of microcell antenna units deployed in respective microcell areas. Each base station unit includes conventional RF base station transmitter and receiver pairs, one for each channel assigned to the microcell. Additional receivers are also provided to receive diversity channels, and to scan channels from neighboring cells. The RF signal outputs from the transmitters are combined and applied to a broadband analog-to-digital converter. Each microcell unit receives a digitized RF signal and reconstructs the analog RF signal using a digital-to-analog converter. The reconstructed RF signal is applied to a power amplifier, the output of which is fed to an antenna for broadcast into the microcell area.

The antenna units include both a main and a diversity antenna. The antennas each independently receive RF signals from the mobile units. The RF signal from the main antenna is applied to an analog-to-digital converter. A second filter receives the diversity signal from the diversity antenna, and applies that signal to a second analog-to-digital converter. The digitized representations of the main and diversity signals can be transported from the remote location to the base station via a high speed digital fiber path.

Thus, the exemplary embodiment outlined above contemplates that the microcell base station/antenna unit pairs are arranged to provide a reusable pattern of channels (as in conventional cellular technology) in the microcell system. The microcell base station units do not normally include an antenna, and can be located in a convenient and preferably low cost location, which may be outside of the microcell system territory if desired.

In one embodiment, digital signal processing is used to reduce the bit rate, so that the signals can be transported from the remote location to the base station via the telephone network, rather than a dedicated fiber. In particular, one embodiment uses a T1 interface between the microcells and the base station. The base station includes a scanning receiver for cell operations, such as hand-in. The scanning receiver analyzes received signal strength indication level (RSSI level) information and generates commands based on the information. Some scanning receivers monitor RSSI levels of adjacent cell clusters and the supervisory audio tone signalling (SAT signalling) information. Since the T1 line lacks the bandwidth needed to transport all baseband voice and control signals for all neighboring microcells, a system has been demonstrated which transports only the necessary information for hand-in evaluation, and then reconstructs the wideband signal in order to use existing scanning receivers at the base station.

In one embodiment, a signal processor at each microcell (or more generally, "remote unit") tabularizes and transmits RSSI level and SAT frequency information of neighboring cells to the base station. The base station decodes this information and performs frequency domain to time domain conversion and reconstructs a wideband representation of signals from neighboring cells at their corresponding signal level, and with their corresponding SAT modulation. The baseband signals of the particular microcell and the control signals of all cells of interest are thereby added to a composite signal for digital to analog conversion. The analog signal is thereby presented to the scanning receiver for hand-in processing.

In one embodiment, a complex mixing is performed and a Hilbert Transform Filter is used to generate real outputs. In another embodiment, a positive frequency input to an inverse Fast Fourier Transform module provides real outputs without requiring a Hilbert transform.

In another embodiment, a system featuring frequency modulation of the SAT tones to each of the carriers is described. In one embodiment, fixed frequency offsets are provided to improve accuracy of center frequencies without increasing the size of the inverse fast Fourier transform used in the system.

BRIEF DESCRIPTION OF THE DRAWINGS

A more complete understanding of the invention and its various features, objects and advantages may be obtained from a consideration of the following detailed description, the appended claims, and the attached drawings in which:

FIG. 1A is a functional block diagram of a first prior art mobile communications system;

DETAILED DESCRIPTION OF THE PREFERRED EMBODIMENTS

In the following detailed description of exemplary embodiments of the invention, reference is made to the accompanying drawings which form a part hereof, in which like numerals refer to like elements throughout the several views, and which is shown by way of illustration only, specific embodiments in which the invention may be practiced. It is to be understood that other embodiments may be utilized and structural changes may be made without departing from the scope of the present invention.

Figure 1B:
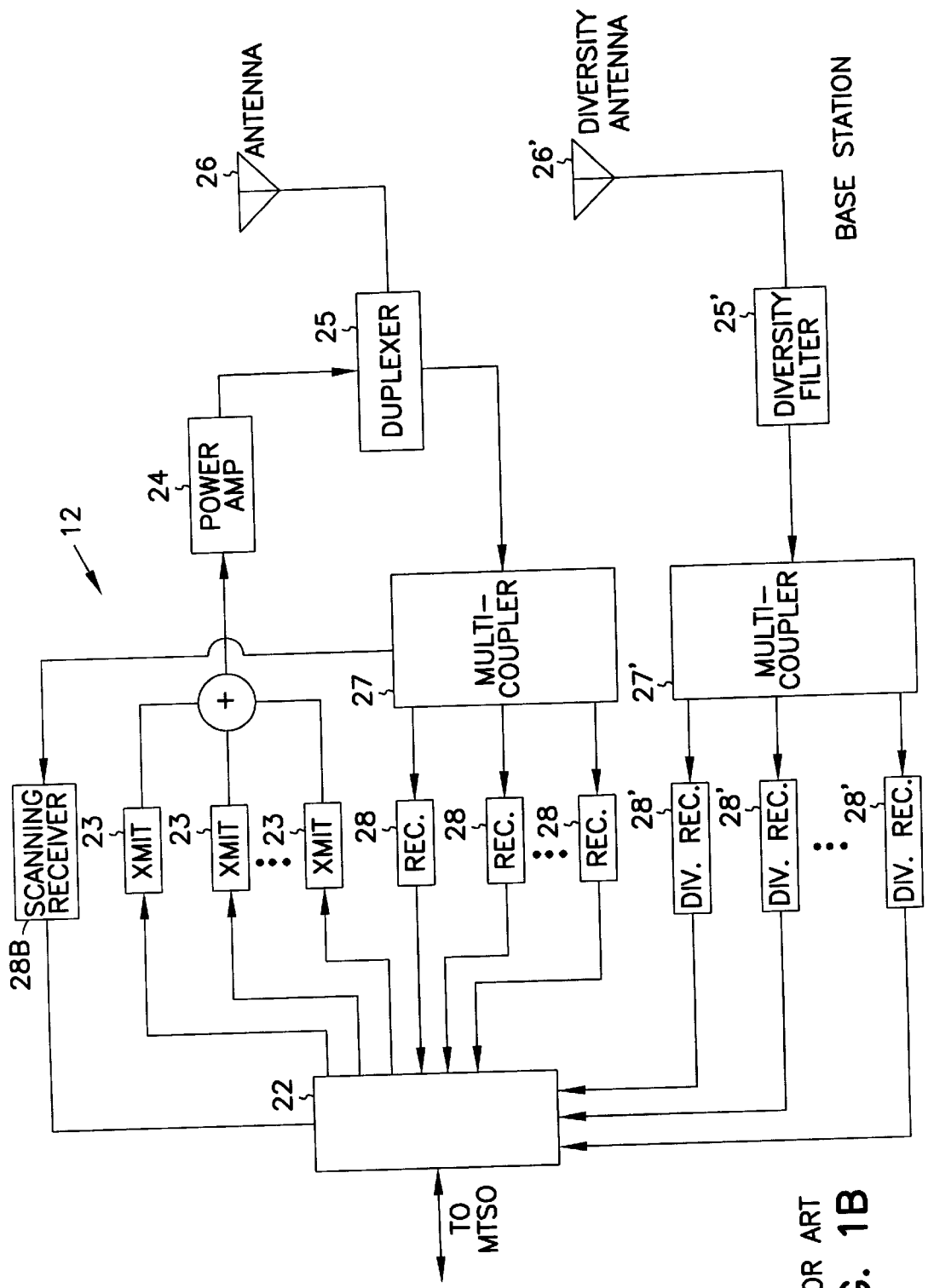
FIG. 1B is a functional block diagram of a prior art base station.
Figure 1C:
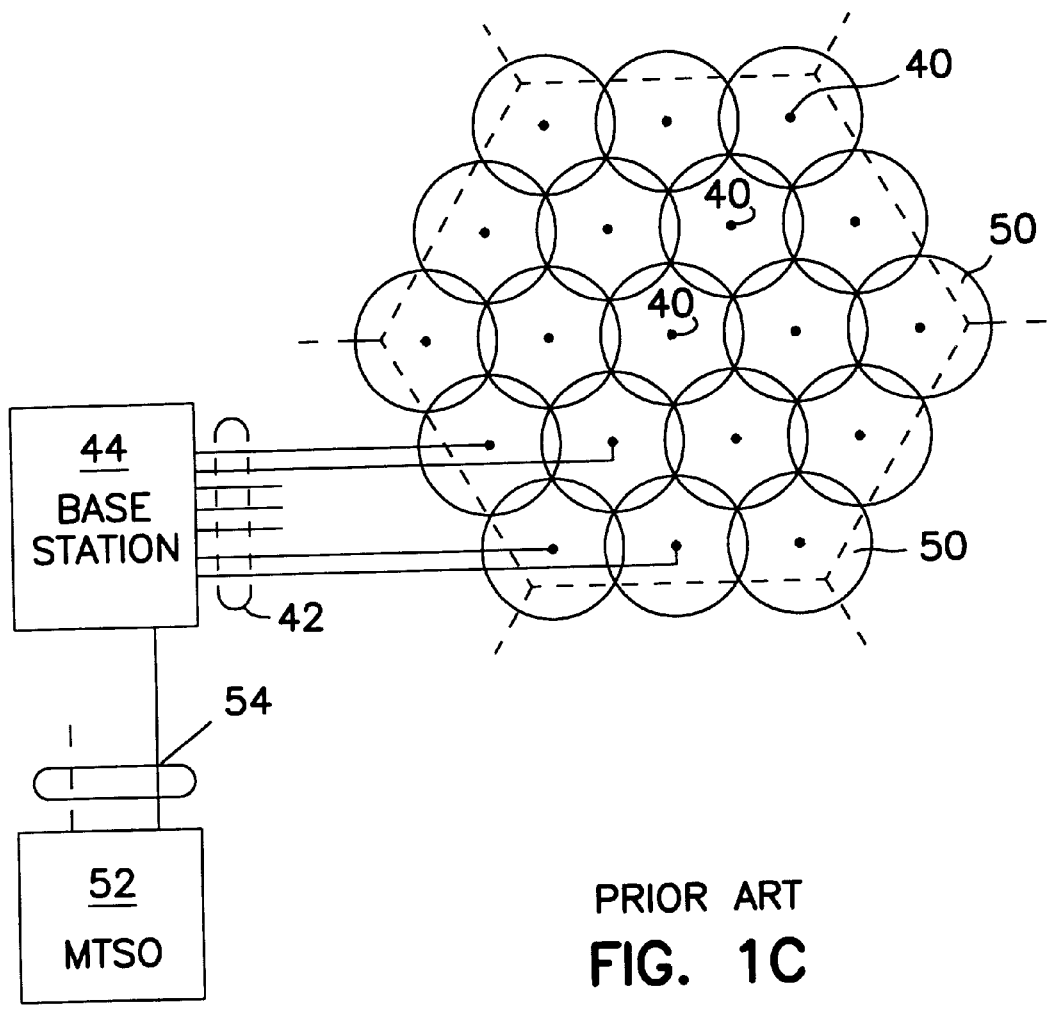
FIG. 1C is a functional block diagram of a prior art microcell mobile communications system.
Figure 2:
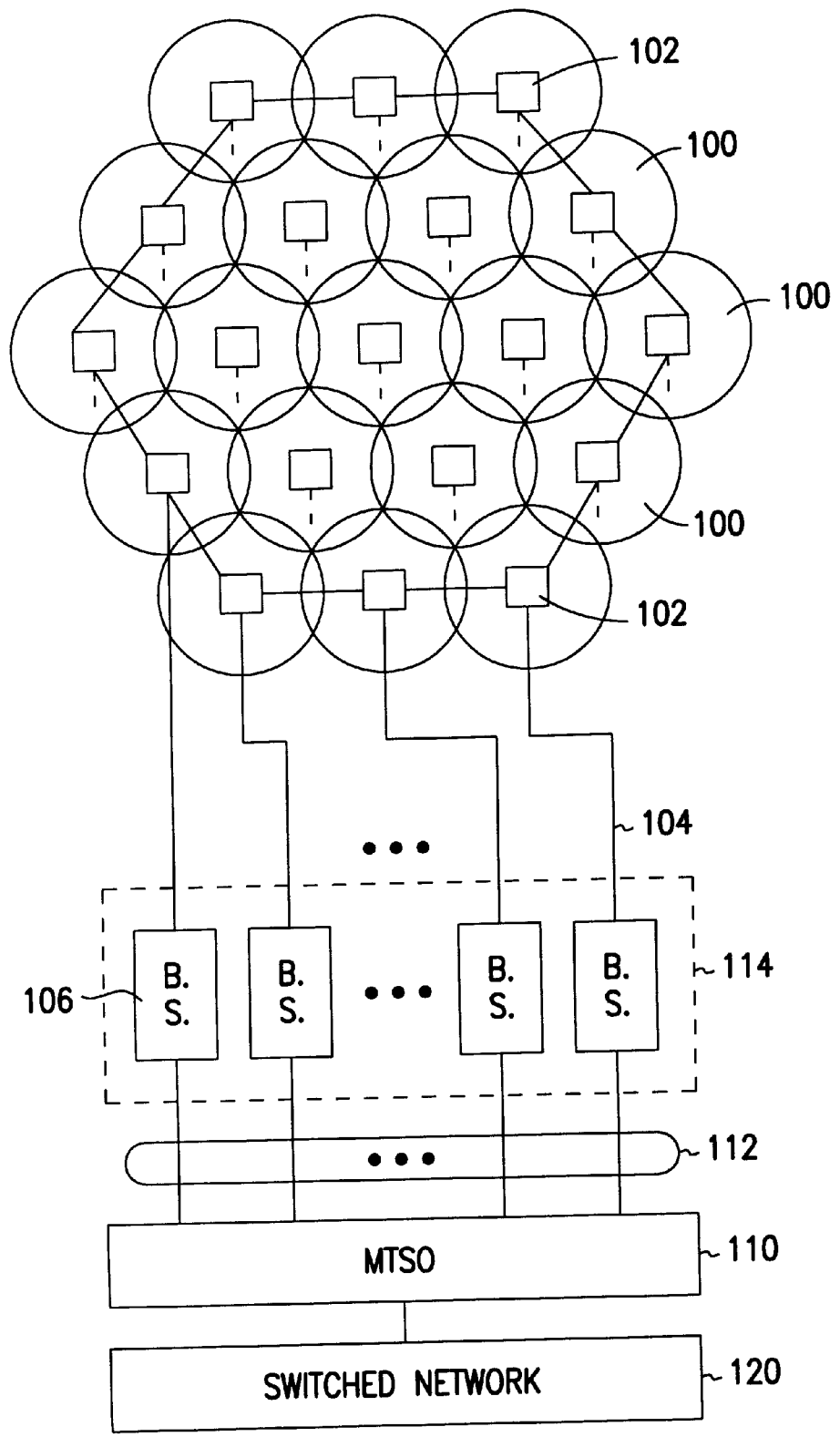
FIG. 2 is a simplified block diagram of an exemplary embodiment of the microcell communications system of the present invention.

The general configuration of one exemplary embodiment of the present invention is shown in FIG. 2. The microcell system includes a plurality of microcell areas 100. Deployed within each microcell area 100 is a microcell remote antenna unit 102. Such units may be deployed on the roof of a building or within a building, or on or in other structures. For example, a microcell antenna unit 102 may be deployed on each floor of a building, on or adjacent an antenna tower, or along a highway corridor.

Remote antenna units 102 are connected through fiber 104 or T1 lines (or optionally another high bandwidth carrier) to respective base station units 106. Base station units 106 are interfaced to MTSO 110 over T1 lines 112. MTSO 110 is interfaced with a switched telephone network 120, as in a conventional cellular phone system. Microcell base station units 106 are preferably located in a single location 114. Such location may be inside or outside of the area serviced by the microcell system, but in any event is preferably conveniently located for maintenance purposes.

Figure 3:
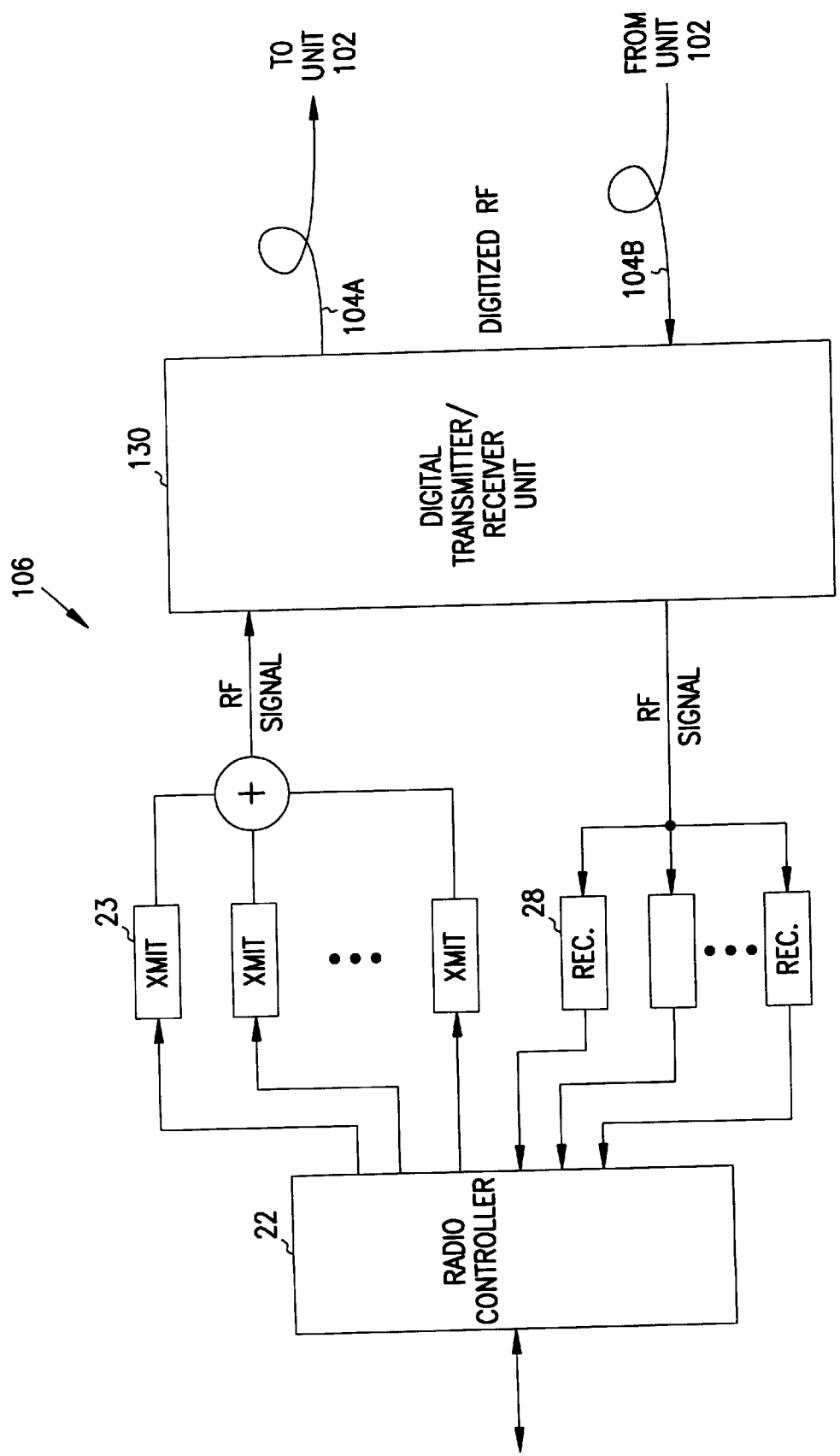
FIG. 3 is a more detailed block diagram of the base station embodiment shown in FIG. 2.

Referring now to FIG. 3 there is shown a simplified diagram of a microcell base station 106 according to one exemplary embodiment of the present invention. Base station 106 includes conventional transmitters and receivers 23 and 28, respectively, and conventional radio controller or interface circuitry 22 to the MTSO 110. A digital transmitter/receiver unit 130 receives the combined RF signal from transmitters 23, digitizes the combined signal and transmits it in digital format over fiber 104A or T1 lines connected to a remote antenna unit 102. Unit 130 also receives a digitized RF signal over fiber 104B or T1 lines from a remote antenna unit 102, reconstructs the corresponding analog RF signal, and applies it to receivers 28. Accordingly, conventional equipment may be used on the downstream (MTSO) side of digital transmitting/receiving unit 130.

In one embodiment of the present invention, telephone lines are used to interconnect microcells to the host equipment and its associated base station equipment. Telephone lines may offer less bandwidth than other broadband communications interfaces, and therefore a system is needed to efficiently exploit the bandwidth of the telephone lines interconnecting the microcells to their respective base stations.

A fiber microcell is described in pending U.S. patent application Ser. No. 08/204,660, which is hereby incorporated by reference in its entirety. The 08/204,660 application describes components of a system which uses optical fibers between microcells for transporting cellular traffic to and from antenna units, and for passively switching. Some of the components and operations may be employed in systems using interconnections other than optical fibers, and therefore, the description of those components and operations are incorporated by reference from the 08/204,660 application.

Figure 4:
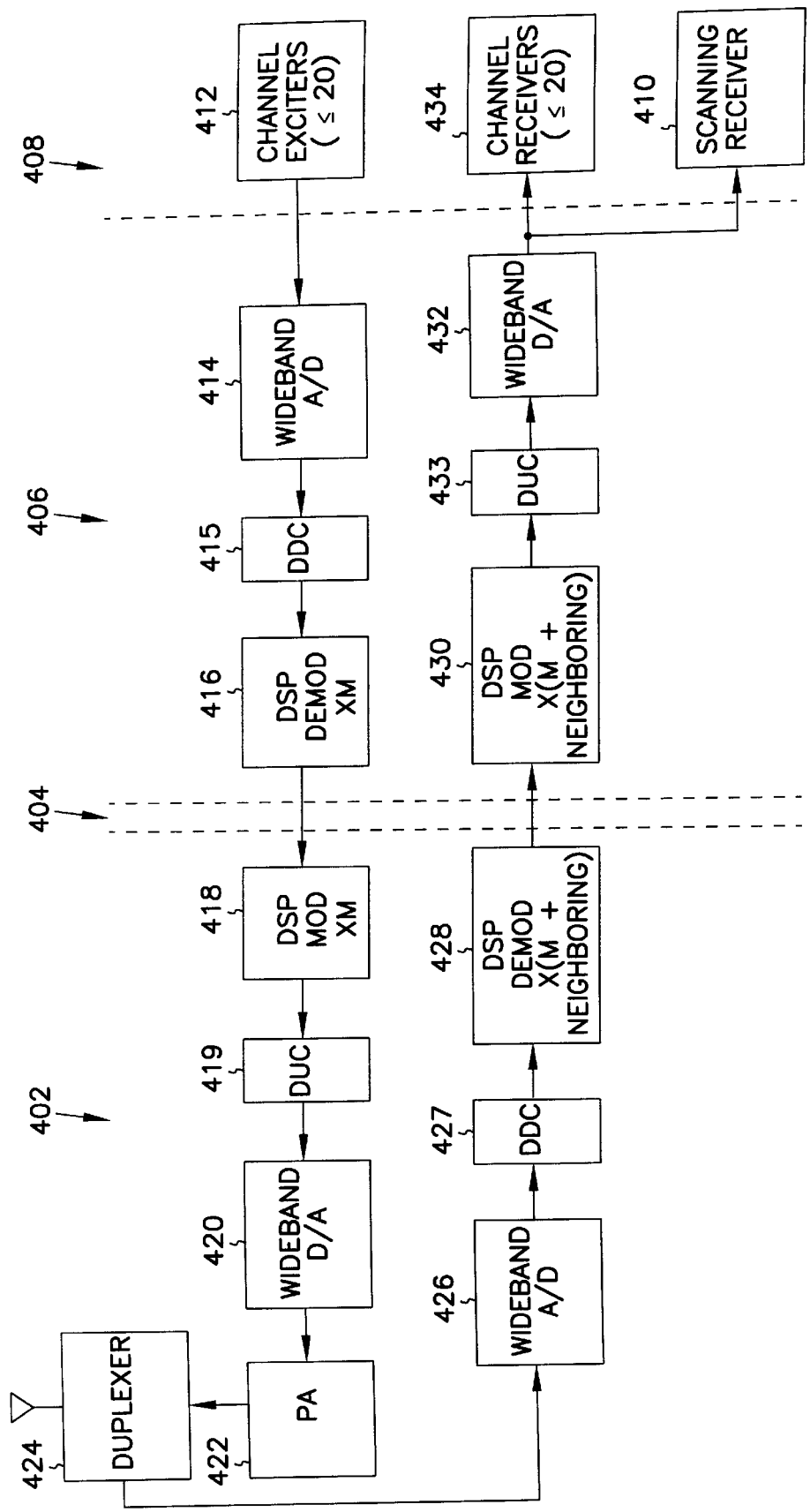
FIG. 4 is a block diagram of one environment in which the present system may be implemented, including a base station, host unit, and remote unit of a cellular system.

FIG. 4 is a block diagram showing communications between a remote unit 402, a host unit 406, and a cellular base station 408. In one embodiment, the remote unit is a microcell station, such as a microcell 102 in FIG. 2, which has been modified as described herein. In this example, the host unit 406 and cellular base station 408 are located at the base station side of the lines 104 of FIG. 2. The remote unit and host unit may be constructed so that an existing cellular base station may be used, as described in the following examples. Other embodiments and applications of the present invention exist, and the microcell application is intended to be demonstrative and not limiting.

In this implementation a scanning receiver 410 is located at the cellular base station 408. The channel receivers 434 process signals from the remote unit 402 for each channel of the remote unit 402, while the scanning receiver 410 processes signals for each channel of each neighboring microcell. The number of channels to a microcell will be denoted as "M" throughout this description. In one embodiment, the remote unit 402 includes twenty (20) channels, thus M=20, however, it is to be understood that the number of channels may vary without departing from the present invention. In FIG. 4, only one remote unit 402 is shown, however, in a seven cell cluster system, the remote unit 402 will have six (6) neighbor cells, each having a number of channels (in this example, M=20 channels each). This means that the scanning receiver 410 may process signals for up to 120 channels of the neighbor cells. It will be understood that the present invention will operate on systems with different numbers of channels and different numbers of neighboring cells per cluster.

In one embodiment, the scanning receiver 410 processes received signal strength indicator (RSSI) as well as supervisory audio tone (SAT) information from the channels of the neighboring cells of the cluster. Some examples of uses of RSSI level signals and SAT signals is provided in the EIA IS20 AMPS Cellular Standard, which is hereby incorporated by reference in its entirety. However, this is only one example and is provided to demonstrate some uses and not intended to be limiting or exclusive. Hand-in functions are performed under control of the scanning receiver 410 based on the RSSI level signals and the SAT signals.

In one embodiment, the SAT signals comprise a set of three continuous tones at 5970 Hz, 6000 Hz, and 6030 Hz. One of these three frequencies is used by the base station of a given cluster. Neighboring base station/clusters use one of the remaining two audio tones. The SAT signal of a particular base station is transmitted by the base station to the mobile. The mobile loops the tone back to the particular base station. If the received tone is different than the one being sent, then interference may have occurred. If no tone is returned, then either the mobile is fading or its transmitter is off.

By monitoring the RSSI level signals and the SAT signals, the scanning receiver 410 performs hand-in. Hand-in is the process by which a cluster of cells receives a mobile as it transfers from an adjacent cluster of cells.

The following description will demonstrate operation of the present invention over a T1 telephone line ("T1 link"), however, it is to be understood that the present invention may be used on a communications link of any bandwidth. For narrowband links, the present system may exploit the bandwidth of the link to transfer only the necessary information across the link.

One embodiment of the present system is shown in FIG. 4. Cellular base station 408 transceives signals with remote unit 402 using host unit 406. Cellular base station 408 includes a scanning, receiver 410. Some of the signals transferred between the host unit 406 and the remote unit 402 are described as follows.

Host unit 406 receives signals from cellular base station 408 and transfers them to remote unit 402 over T1 link 404. Analog signals from the channel exciters 412 are converted to digital signals by the wideband A/D 414 and downconverted by digital downconverter 415 prior to processing by digital signal processor demodulator 416. The "xM" designation indicates that the channels (e.g., 20 channels in this example) are individually processed by demodulator 416 before being transmitted over the T1 line 404 to digital signal processor modulator 418. The received digital signals are processed by modulator 418, upconverted by digital upconverter 419, and transformed into an analog wideband signal by wideband D/A 420. In one embodiment, demodulator 416 and modulator 418 include a DSP for each channel processed, which is denoted by the "xM" on FIG. 4. The wideband signals are transmitted by power amplifier 422 and antenna/duplexer 424.

Host unit 406 receives digital signals from remote unit 402 over T1 link 404. Signals received by antenna/duplexer 424 are transformed into digital representations by wideband A/D 426 and downconverted by digital downconverter 427. DSP demodulator 428 processes the digital representations and transmits the resulting datastream over T1 link 404 to DSP modulator 430. In one embodiment, demodulator 428 and modulator 430 include one DSP for each channel processed and for each neighboring channel, as shown by the "x(M+Neighboring)" notation in FIG. 4. The signals are then upconverted by digital upconverter 433 and transformed to analog signals by wideband D/A 432 and transmitted to channel receivers 434 and scanning receiver 410.

In one embodiment, scanning receiver 410 is designed to receive the wideband analog signal and detect the RSSI level and SAT identification for each re-modulated signal corresponding to a neighboring cell.

In the embodiment, where remote unit 402 has twenty (20) channels and has six (6) neighboring cells, each having twenty (20) channels, the scanning receiver 410 processes an analog version of the RSSI level information and SAT frequency information for the 120 channels of the neighboring units to perform hand-in for transceivers moving about the geographical cellular coverage region. If a T1 link 404 is used to transfer information between the remote unit 402 and host unit 406, then the bandwidth of the T1 link 404 and the capacity of the DSP hardware (428 and 430) is insufficient to transfer all of the baseband audio information and RSSI level and SAT frequency information for all of the channels of remote unit 402 and the channels of the neighboring cells.

One approach is to transmit all 120 neighboring channels in the same manner as the 20 home channels, using a plurality of T1 links and associated hardware operating in parallel. Such an increase in hardware, however, is impractical in some applications, since it implies a sixfold increase in DSP hardware and T1 capacity.

Another approach is a time multiplex system involving the transfer of one scanning channel at a time, synchronous with the tuning of the scanning receiver 410. However, this approach requires knowledge of the proprietary protocols in the cellular base station 408, or detection of scanning receiver signalling (e.g., scan receiver LO). This may be impractical in systems where the scanning receiver 410 is not dedicated or where the scan function is delegated to multiple receivers.

Another approach is to place the scanning receiver 410 at the remote site. This way the scanning receiver data is transported to the base station controller for hand-in functions. This approach also requires knowledge of base station protocols.

Figure 5:
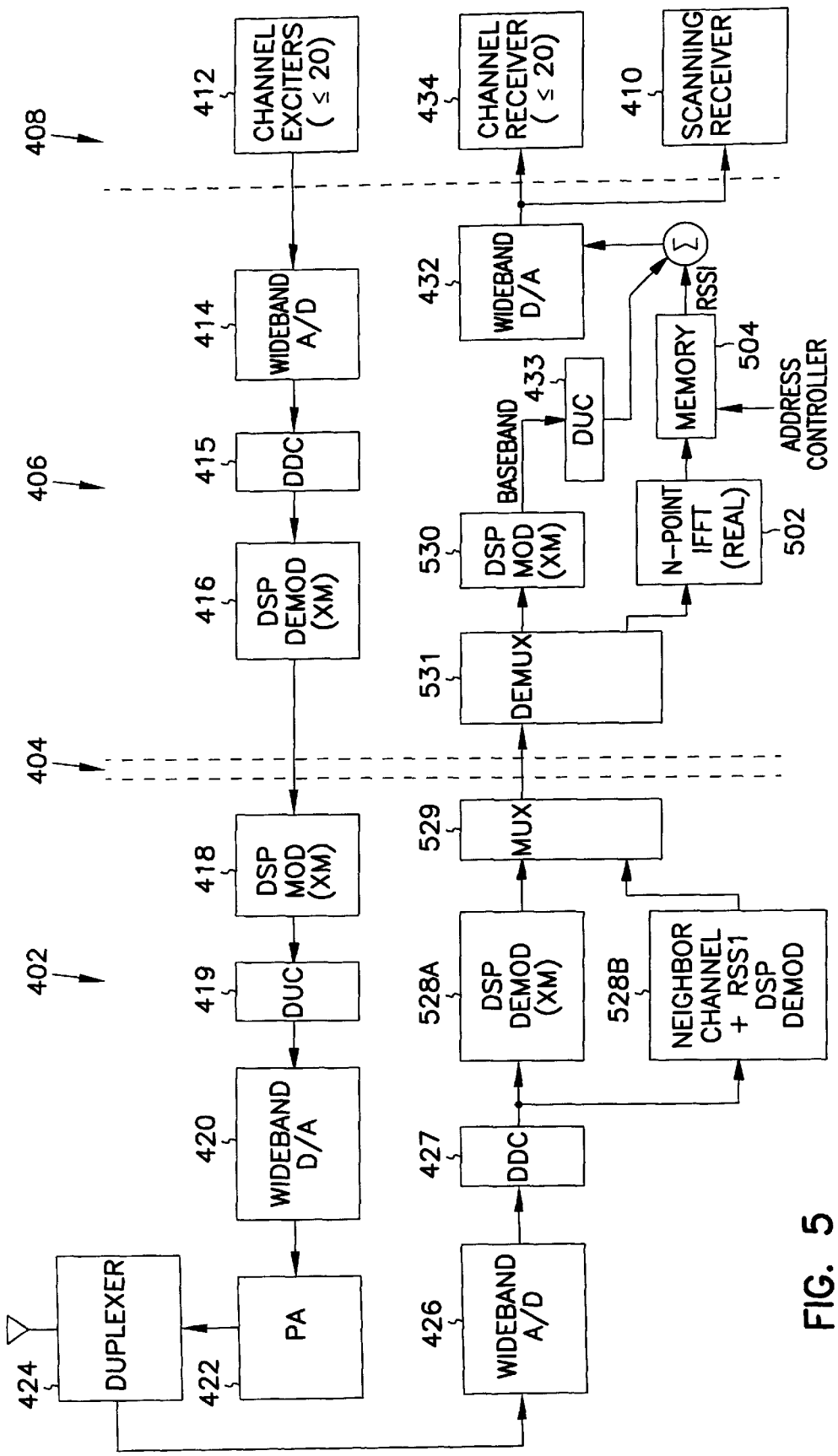
FIG. 5 is a block diagram of a base station, host unit, and remote unit of a cellular system according to one embodiment of the present invention.
Figure 6:
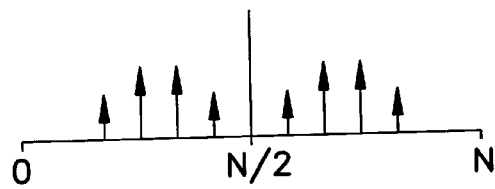
FIG. 6 is a spectral diagram showing spectral symmetry about the N/2 position.

Yet another approach is to transport only the RSSI level information over the T1 line, and reconstruct unmodulated carriers using an N-point inverse Fourier transform, as shown in FIG. 5. In this embodiment, DSP demodulator 528A is programmed to process the channels associated with a particular remote unit 402, in this example 20 channels. DSP demodulator 528B is programmed to detect the RSSI level information for each carrier of the neighboring signals in the digitized wideband signal received from wideband A/D 426. The channels and the neighboring RSSI information are multiplexed by multiplexor 529 and transferred as digital data over T1 link 404. The information is demultiplexed by demultiplexer 531 so the channels are modulated by DSP modulator 530 and the digitized RSSI level parameters for the neighboring channels are processed by an N-point inverse fast Fourier transform ("IFFT") 502. The inputs to the IFFT 502 are made symmetric about N/2 in order to ensure a real time domain output from the N-point IFFT 502. This is shown in FIG. 6. In this embodiment, N/2 is greater than the number of channels transformed. The real time domain output is stored in RAM 504. This real time domain output may be updated periodically, and need only be updated as fast as RSSI level information is scanned by scanning receiver 410. In one embodiment, this rate is on the order of a few times a second. If the RAM is read at 30.72 Megasamples/second then the circular read of the RAM constitutes a time domain representation of multiple carriers. With symmetric (real) input and inputs on bin centers, the endpoints of the time domain sample are continuous (i.e., there are no discontinuities when the circular buffer "wraps around").

Figure 7:
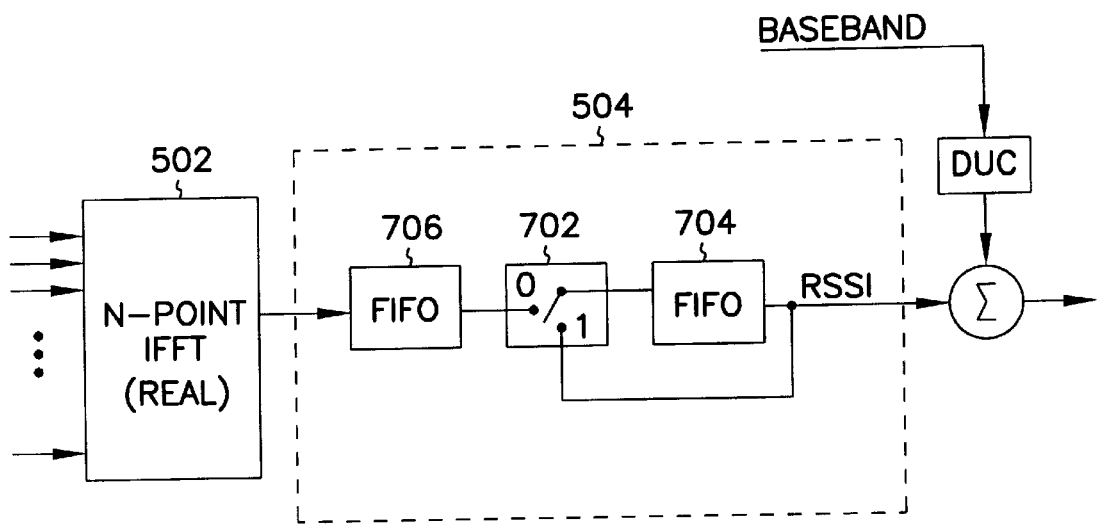
FIG. 7 is a block diagram showing one embodiment of a FIFO memory circuit for circular reads of a time domain equivalent of the RSSI level information.

FIG. 7 shows an alternate memory embodiment, in which an input signal to a switch 702 is used to clock new data into FIFO 704 from FIFO 706. When the input is in a first Boolean state, for example a logical zero (0), then bits from FIFO 706 are clocked into FIFO 704. When the input is a second Boolean state, for example a logical one (1), then FIFO 704 keeps recirculating its contents. In one embodiment, the input signal is generated from control logic. In another embodiment, a DSP provides the input signal. Other hardware and/or software may be used to generate the input signal without departing from the scope and spirit of the present invention. Other Boolean state combinations may be used and other memory embodiments are possible which do not depart from the scope of the present invention. For example, one embodiment uses synchronous line buffers in place of FIFOs. Another example embodiment uses dual-port random access memories (RAM) in place of FIFO's. Other memory devices may be substituted and combined without departing from the scope and spirit of the present invention.

This solution is acceptable for scanning receivers 410 which only require RSSI level information, however, some scanning receivers require both RSSI level information and SAT frequency information to perform hand-in functions.

Figure 8A:
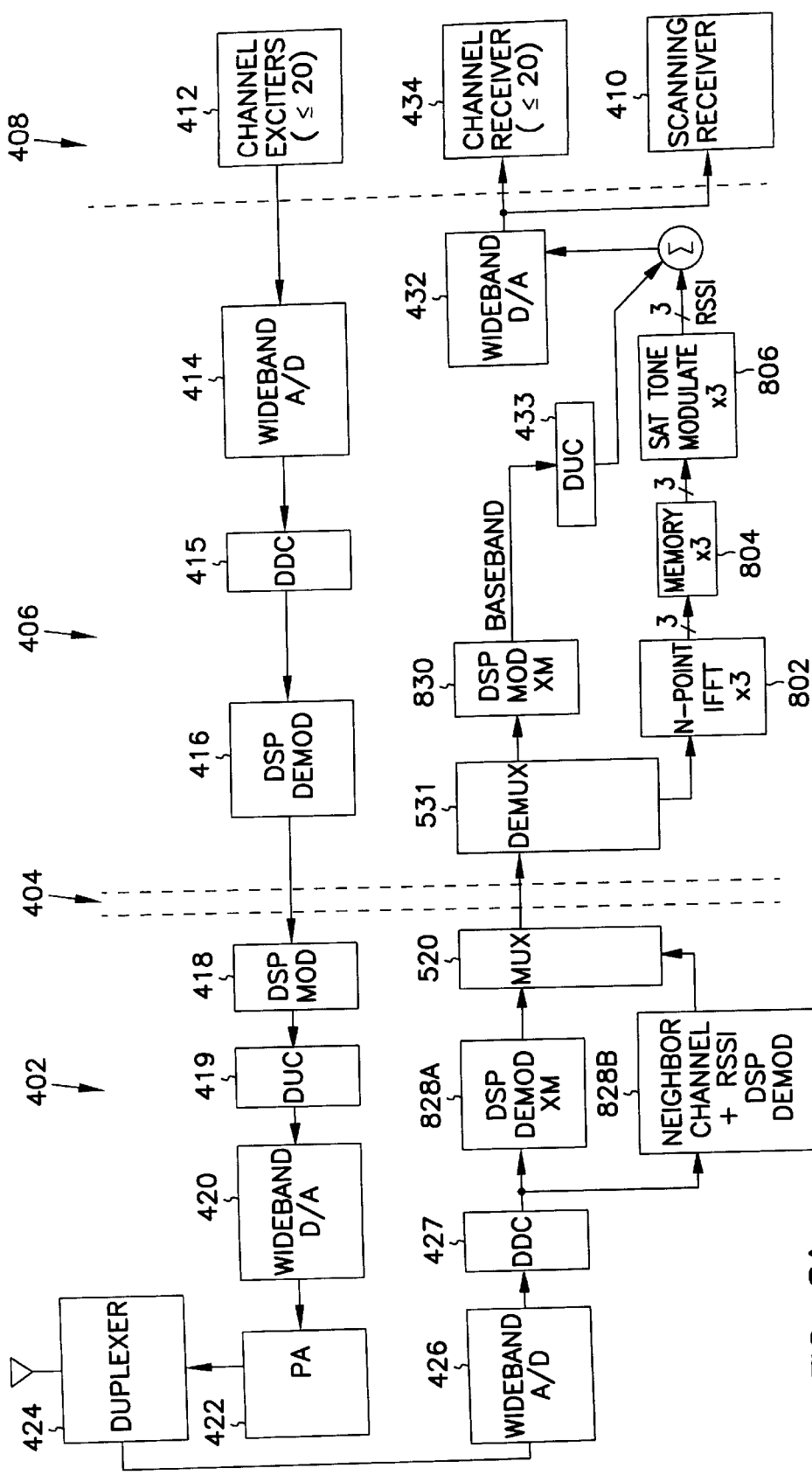
FIG. 8A is a block diagram of a base station, host unit, and remote unit of a cellular system according to one embodiment of the present invention.

The next embodiment provides RSSI level information and SAT frequency information for scanning receivers which require both sets of information to process hand-in requests. FIG. 8A shows a generalized block diagram of such a system. In the microcell application, signals from antenna/duplexer 424 are received and converted to digital signals by wideband A/D 426. The downconverted signals are passed to DSP demodulators 828A and 828B, which process the microcell channels. In this embodiment, DSP demodulator 828A is programmed to process M channels associated with a particular remote unit 402; in this example M=20 channels. DSP demodulator 828B is programmed to process the RSSI level and SAT frequency information for each carrier of the neighboring channels in the digitized wideband signal received from wideband A/D 426. The M channels and the neighboring RSSI and SAT frequency information are multiplexed by multiplexer 529 and transferred as digital data over T1 link 404. The information is demultiplexed by demultiplexer 531 so the M channels are modulated by DSP modulator 830 and the digitized RSSI level parameters and SAT frequency information for the neighboring channels are processed by an N-point inverse fast Fourier transform ("IFFT") 802.

In one embodiment, the RSSI level information and SAT frequency information for each neighboring cell site signal are detected and tabularized by DSP demodulator 828B and transported over the T1 link 404 with the M channel baseband audio information and control signal information processed by DSP demodulator 828A. In one embodiment, for each active neighboring signal detected by the remote unit, the following information is transmitted to the host site:

| | |
|---|---|
| FCC channel number | 10 bits; |
| RSSI level (processed by a log function) | 8 bits; and |
| SAT state (none, 5970, 6000, 6030) | 2 bits. |

Thus a total of 20 bits is communicated to the host site 406. In this exemplary embodiment, one time slot of a T1 frame is dedicated to the transport of scanning receiver data. Each T1 time slot is eight bits wide; thus, three consecutive T1 frames are used to transport the data for each detected neighboring channel. At the host site the RSSI level information is identified by channel number and sorted according to their respective SAT frequency. These data are received by demultiplexer 531 and sent to three N-point IFFTs 802, one for each of the three SAT frequencies.

The time domain equivalent RSSI level information is stored in circulating memory 804. The time domain equivalent RSSI level information is mixed with a carrier of frequency equal to their respective SAT signal by mixer 806 and then combined with the M channel baseband information prior to digital-to-analog conversion by wideband D/A 432. The analog equivalents are received by scanning receiver 410 for hand-in evaluation.

Figure 8B:
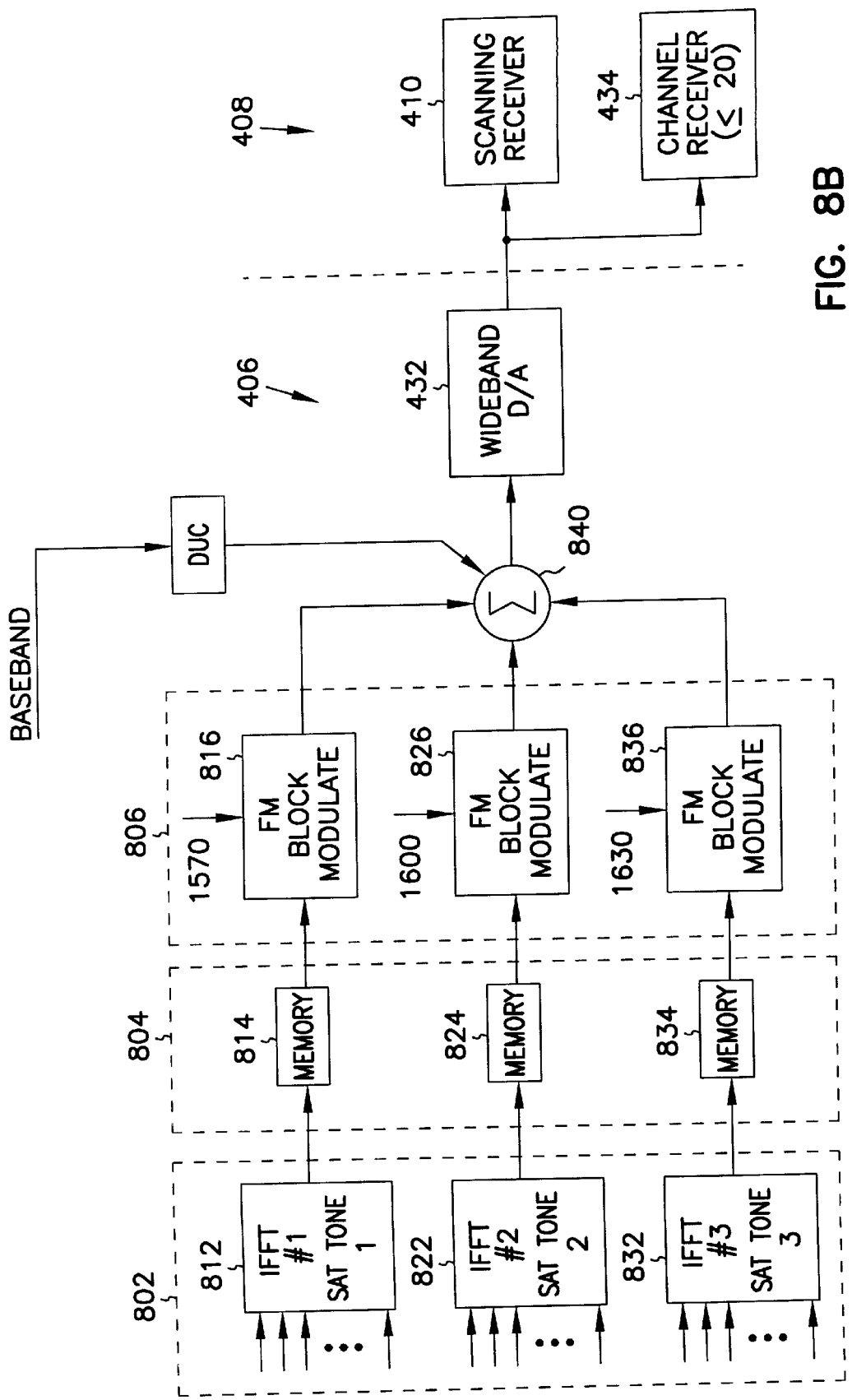
FIG. 8B is a block diagram of a SAT tone modulation system for RSSI level information.

FIG. 8B shows a block diagram having three inverse fast Fourier transforms 812, 822, and 832 for RSSI level data grouped by their respective SAT frequencies, such as 5970 Hz, 6000 Hz, and 6030 Hz, respectively. The RSSI level data and their respective SAT frequency data are detected using DSP demodulators 828A and 828B at the remote unit 402. The RSSI level data are sorted according to their respective channel numbers and corresponding SAT frequencies which were transmitted over T1 link 404 in tabular form. In one embodiment, the RSSI level information is decoded at the host unit 406 by a DSP chip and the RSSI level samples are provided to their respective IFFT algorithms 812, 822, and 832, according to the SAT frequency associated with each channel. In one embodiment, these algorithms operate in a single DSP. In alternate embodiments dedicated IFFT chips are used. Other hardware and software combinations may be employed without departing from the scope and spirit of the present invention. The number of SAT frequencies may also vary without departing from the present invention.

The RSSI level information received by the IFFT DSP 802 is processed so that the N-point IFFTs receive inputs which are symmetric about N/2 to ensure the time domain outputs are real. These real time domain outputs are stored in memories 814, 824, and 834, respectively. The time domain outputs are circularly read and the resulting outputs are block modulated with the SAT signal carrier frequency associated with each input; 816, 826, and 836, respectively. The final results are summed with summer 840 and output to the wideband D/A 432 and to scanning receiver 410 for hand-in processing. In this way, an existing scanning receiver 410 may be used to decode the wideband signal, using the bandwidth of the T1 link, which is sufficient as only the RSSI level information and SAT frequency information for each neighboring channel are transferred. In this embodiment, the M channel baseband audio and signalling of the remote unit 402 is summed with the block modulated signals to provide the entire wideband signal.

It is to be understood that memories 814, 824, and 834 may be any of the RAM or FIFO embodiments described herein, and may use other memory elements and combinations without departing from the scope of the present invention.

Figure 9:
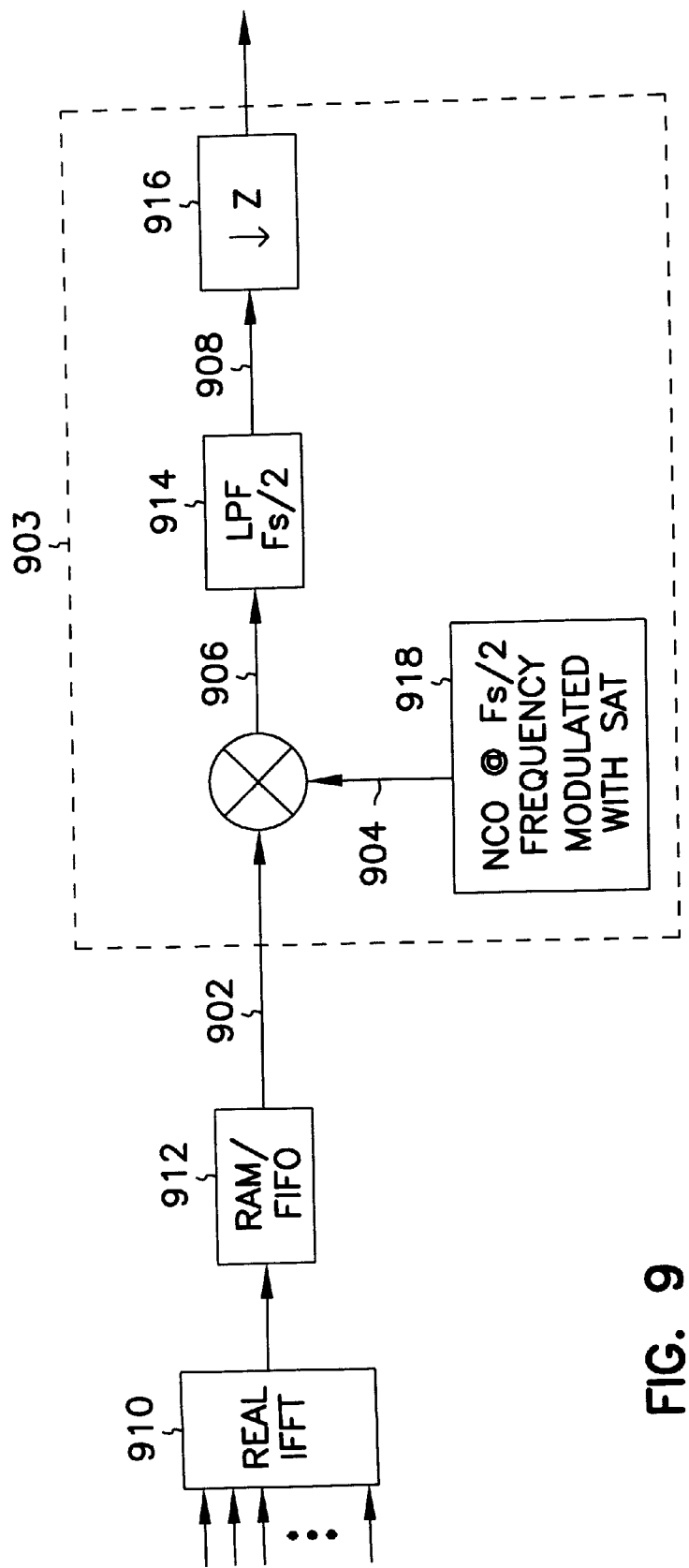
FIG. 9 is a block diagram of one embodiment of a SAT frequency modulation system for one of the SAT frequencies.
Figure 10:
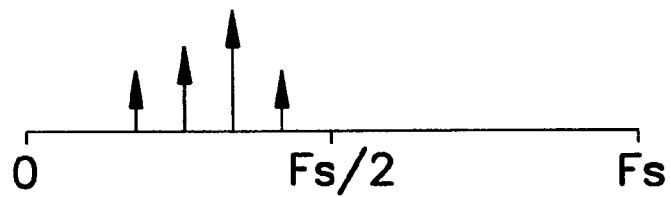
FIG. 10 is a frequency graph of RSSI level information received from the remote units according to one embodiment of the present invention.

FIG. 9 shows one embodiment of a SAT signal modulation system for one of the three SAT frequencies. The remaining SAT frequencies are processed using the same system. The inputs to the IFFT 910 are the RSSI level information received over the T1 link 404 for a particular SAT frequency. The inputs to the IFFT 910 are symmetrical about the N/2 position to provide a real time domain output of the RSSI level information. The output from the IFFT 910 is a real time domain signal in serial digital format which is stored in the memory 912. Memory 912 is a RAM in one embodiment. In an alternate embodiment, memory 912 is a dual FIFO arrangement. Other memory embodiments are possible without departing from the scope and spirit of the present invention. The memory 912 is circularly read and updated only as often as the scanning receiver 410 needs an update. A frequency graph of the output of memory 912 is shown in FIG. 10.

Figure 11:
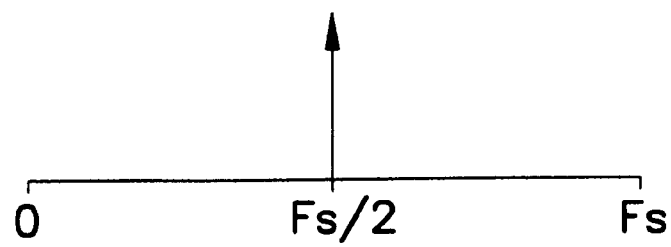
FIG. 11 is a frequency graph of a mixing signal at Fs/2 for mixing according to one embodiment of the present invention.
Figure 12:
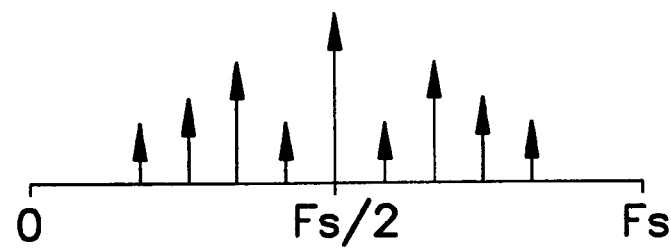
FIG. 12 is a resulting frequency graph of the mixing of the RSSI level information in FIG. 10 and the mixing signal information in FIG. 11 according to one embodiment of the present invention.
Figure 13:
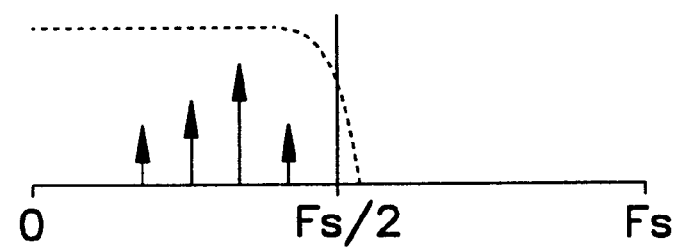
FIG. 13 is a resulting frequency graph of the signal information in FIG. 12 after attenuation by a low pass digital filter according to one embodiment of the present invention.

In the embodiment shown in FIG. 9, the overall sample rate of the system is twice the sampling rate of the A/D and D/A's of the system, Fs. The output of the memory is mixed with a frequency modulated local oscillator signal at Fs/2 (904) which is mixed with the SAT frequency for this signal path, as shown in FIG. 11. The resulting output is the spectrum 906 of FIG. 12. A low pass filter with cutoff at Fs/2 914 is used to attenuate the upper portion of the spectrum 908, as shown in FIG. 13. This output is downsampled by a factor of 2 by downsampler 916.

The sampling rate of the A/D and D/A's, Fs, according to one embodiment of the present invention, is approximately 30.72 Megasample/second, however, the system of FIG. 9 needs to run at 61.44 Megasample/second, which is double Fs. It should be noted that this process inverts the spectrum, requiring the IFFT of the RSSI level information to be loaded in opposite order. Although this embodiment processes real signals, the 61.44 Megasample/second rate may exceed the maximum speed of some field programmable gate arrays (FPGAs).

Figure 14:
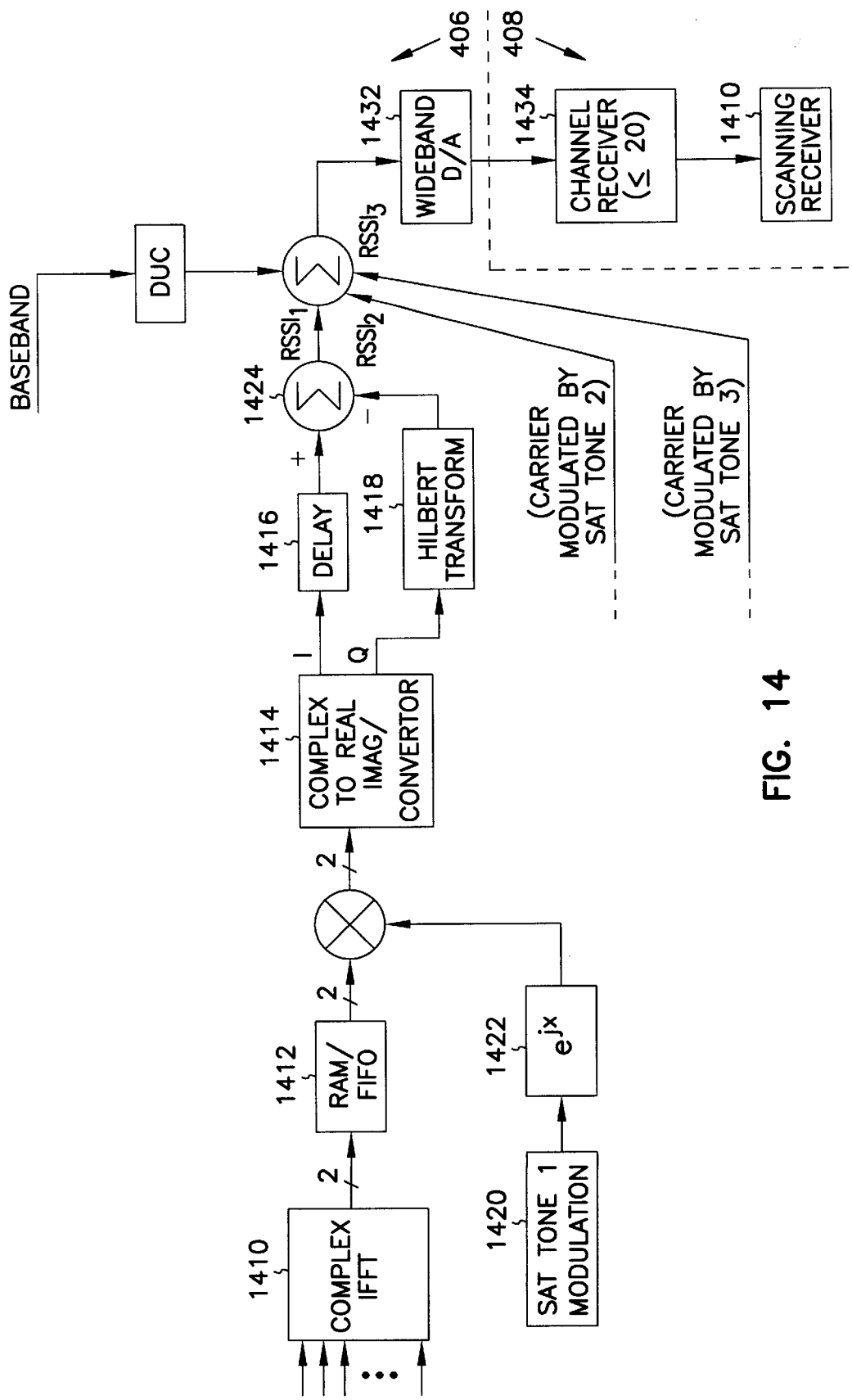
FIG. 14 is a block diagram of one embodiment of a SAT frequency modulation system for one of the SAT frequencies, and showing the inputs for the remaining SAT frequencies and the baseband information.

An embodiment featuring a lower sample rate is shown in FIG. 14. A single path for one of the three SAT frequencies is illustrated in detail and its output is labelled $RSSI_1$. The other paths are modulated by their respective SAT frequencies and are shown as paths $RSSI_2$ and $RSSI_3$, and their processing may be performed using the method described for the first path as follows. RSSI level data and their respective SAT frequency data for neighboring channels are detected using a DSP demodulator at the remote unit 402. The RSSI level data is processed and transmitted as RSSI level information according to their respective channels and their respective SAT frequencies in tabular form over T1 link 404. RSSI level information for a particular SAT frequency are input to the complex IFFT 1410 and a complex output is produced. The system of FIG. 14 operates at Fs=30.72 Megasample/second. This system uses a complex analytic signal, $e^{jx}$, where x is a signal from source 1420 (having the same frequency as the particular SAT frequency of interest), and mixed with the complex time domain RSSI weighted carriers output from complex IFFT 1410. The output from the complex mix is separated into its real and imaginary components by convertor 1414. The imaginary component is delayed using delay 1416 and the real component passes through a Hilbert Transform 1418. The resulting outputs are subtracted by subtractor 1424 and the final output $RSSI_1$ is then summed with the other SAT frequency paths $RSSI_2$, and $RSSI_3$ and the M channel baseband audio information and signalling information for the remote unit 402. The information is then sent to the wideband D/A 432 and ultimately to the scanning receiver 410 for hand-in evaluation and processing.

The use of complex math allows the mixing with a baseband FM analytic carrier while maintaining the ability to separate positive and negative frequencies. After the mix, the positive and negative frequencies are not symmetric and the modulation is 180 degrees out of phase. The Hilbert Transform Filter 1418 is used to isolate the positive frequencies. The inserted delay 1416 is used to match the delay of the Hilbert Transform Filter 1418 which is, in one embodiment, a finite impulse response (FIR) implementation.

Figure 15:
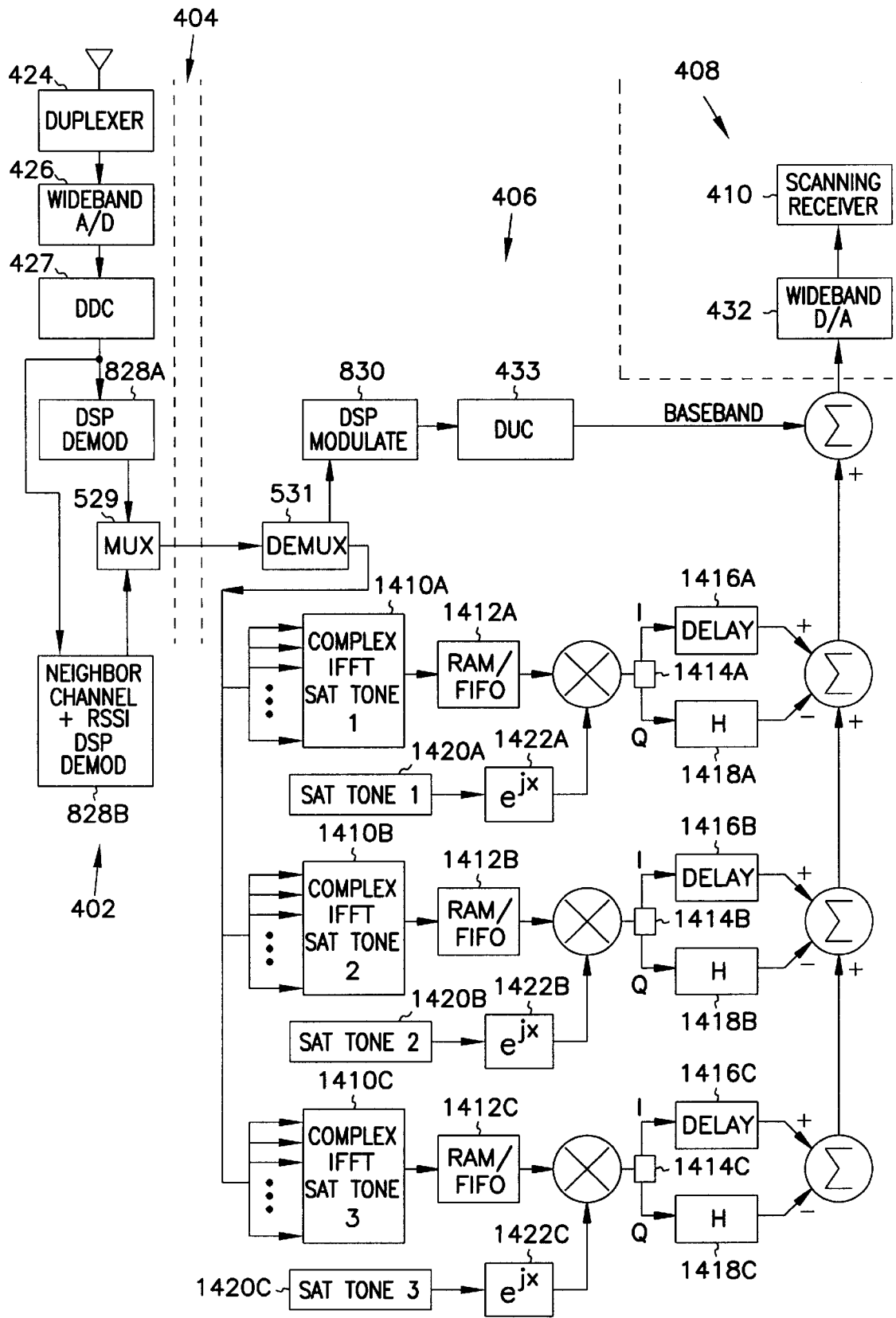
FIG. 15 is a block diagram of a communication system employing the SAT frequency modulation system of FIG. 14.

A larger scale drawing of the implementation of FIG. 14 is shown in FIG. 15. The components in FIG. 14 were shown in FIG. 15 for each SAT tone with the components used with the first SAT tone having an "A" suffix, the components used with the second SAT tone having a "B" suffix, and the components used with the third SAT tone having a "C" suffix. As described earlier in one embodiment, the RSSI level data for the neighboring channels are detected at the DSP demodulators at remote unit 402 and transferred via a tabular format to the host unit 406. The RSSI level information for each particular SAT frequency are separated and sent to their respective complex IFFT, 1410A, 1410B, and 1410C. The baseband information and time domain RSSI weighted carriers modulated with their particular SAT information are combined and transferred to the scanning receiver 410 for hand-in evaluation.

Another embodiment replaces the frequency modulated complex analytic signal with a circularly read memory. In one embodiment, the samples of the modulated $e^{jx}$ function are in a form that repeats in an integral number of 30.72 MHz samples (or whatever sampling frequency, Fs, the system uses). The output is $e^{jx}=Cos(\omega_m t)+j Sin(\omega_m t)$, where $\omega_m=2\times\pi\times5970$, 6000, or 6030 Hz. These frequencies can be represented to within 1 Hz by a waveform which repeats in the following number of integral samples:

| No. of Samples @ 30.72 Mhz | Actual Frequency |
|---|---|
| 746 | 5969.69 |
| 720 | 6000.00 |
| 695 | 6029.44 |

Note that when calculating the $e^{jx}$ term the $Cos(\omega_m t)$ and $Sin(\omega_m t)$ terms are identical except for a 90 degree phase difference. This means that for each SAT frequency, an identical table of values is used to generate the $e^{jx}$ output. In one embodiment a single table is generated and stored in memory for each SAT signal. The values are then circularly read out of the memory with a 90 degree phase difference to account for the Sin and Cos phase difference.

Yet another embodiment provides the SAT frequency modulation of the RSSI level information without having to use a Hilbert Transform Filter. The Hilbert Transform Filter was needed because of the presence of positive and negative frequencies at the output of the IFFT. The Hilbert Transform Filter becomes unnecessary if negative frequencies are eliminated at the IFFT. In a complex IFFT, the negative frequencies are eliminated by zero padding the inputs above N/2.

For a single carrier of frequency $\omega_c$, the complex IFFT output becomes $\text{Cos}(\omega_c t)+j\,\text{Sin}(\omega_c t)$, wherein $\omega_c$ represents the positive frequency component only. This output is then complex multiplied with the SAT modulated 0 Hz carrier, which is $\text{Cos}(\beta\,\text{Sin}(\omega_m t))+j\,\text{Sin}(\beta\,\text{Sin}(\omega_m t))$. However, since only the real output from the complex multiply is needed, the resulting equations require only 2 real multiplies:

$$\text{RE}\{[\text{Cos}(\omega_c t)+j\text{Sin}(\omega_c t)]\times[\text{Cos}(\beta\text{Sin}(\omega_m t))+j\text{Sin}(\beta\text{Sin}(\omega_m t))]\}=$$
$$\text{Cos}(\omega_c t)\text{Cos}(\beta\text{Sin}(\omega_m t))-\text{Sin}(\omega_c t)\text{Sin}(\beta\text{Sin}(\omega_m t))=$$
$$\text{Cos}(\omega_c t+\beta\text{Sin}(\omega_m t)),$$

which is a real output.

Figure 16:
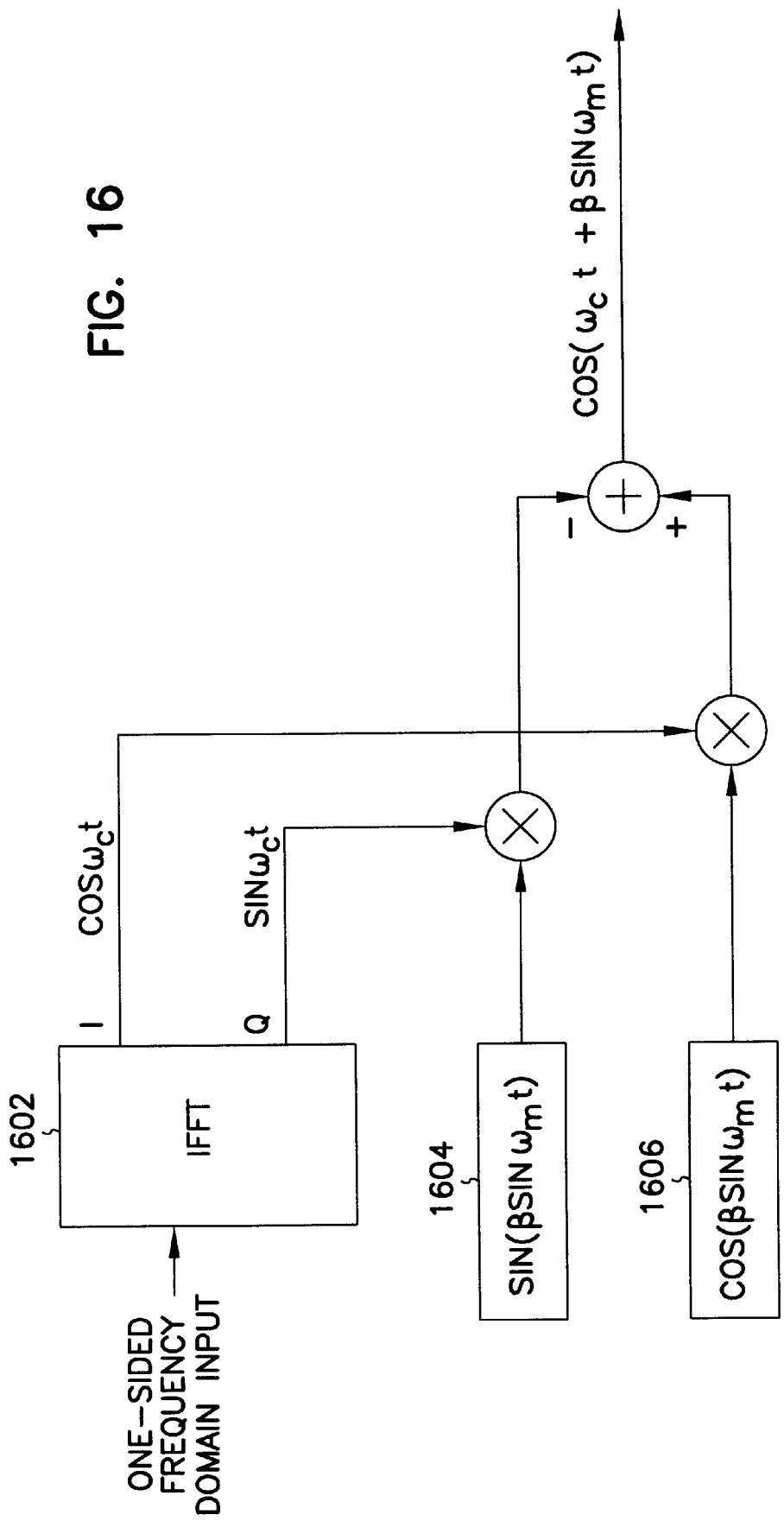
FIG. 16 is a block diagram of one embodiment of a SAT frequency modulation system for one of the SAT frequencies.

An embodiment combining the zero padding/positive frequency concept with the two (2) multiply concept is shown in FIG. 16. In one embodiment, the IFFT 1602 output is calculated at various times and the outputs are stored in memory. The SAT modulated sources 1604 and 1606 are also stored in memory. Both memories are read circularly at a 30.72 MHz rate (or whatever sampling frequency is used). The multiplies and adds also take place at that rate.

Therefore, the implementation of one embodiment of the present system is as follows:

1. At the remote unit 402, detect the SAT frequency data and RSSI level data of each scanned channel.
2. Transmit the SAT frequency information and RSSI level information for all scanned channels to the host unit 406.
3. Sort the RSSI level information and channel numbers corresponding to each of the three SAT frequencies (e.g., a 3 SAT tone embodiment).
4. For each SAT frequency:
   A. construct a one sided (positive frequency only) representation of the frequency domain spectrum of the carriers corresponding to that SAT frequency.
   B. calculate the complex IFFT and store the real and imaginary time domain result in RAM (to be updated periodically, or at a rate commensurate with the scanning receiver 410).
   C. calculate the modulated zero Hz complex carrier component waveforms, $\text{Sin}(\beta\,\text{Sin}(\omega_m t))$ and $\text{Cos}(\beta\,\text{Sin}(\omega_m t))$ and store in memory (may be calculated once and need not be updated).
   D. Calculate the $\text{RE}\{\text{IFFT}\}\times\text{Cos}(\beta\,\text{Sin}(\omega_m t))-\text{IM}\{\text{IFFT}\}\times\text{Sin}(\beta\,\text{Sin}(\omega_m t))$ at a 30.72 MHz rate.
5. Sum outputs corresponding to all 3 SAT frequencies with the outputs from the traffic channel synthesizers. In this example, the traffic channel synthesizers produce synthesized replicas of the 20 channels (M channels) identified with a given cell.

Figure 17:
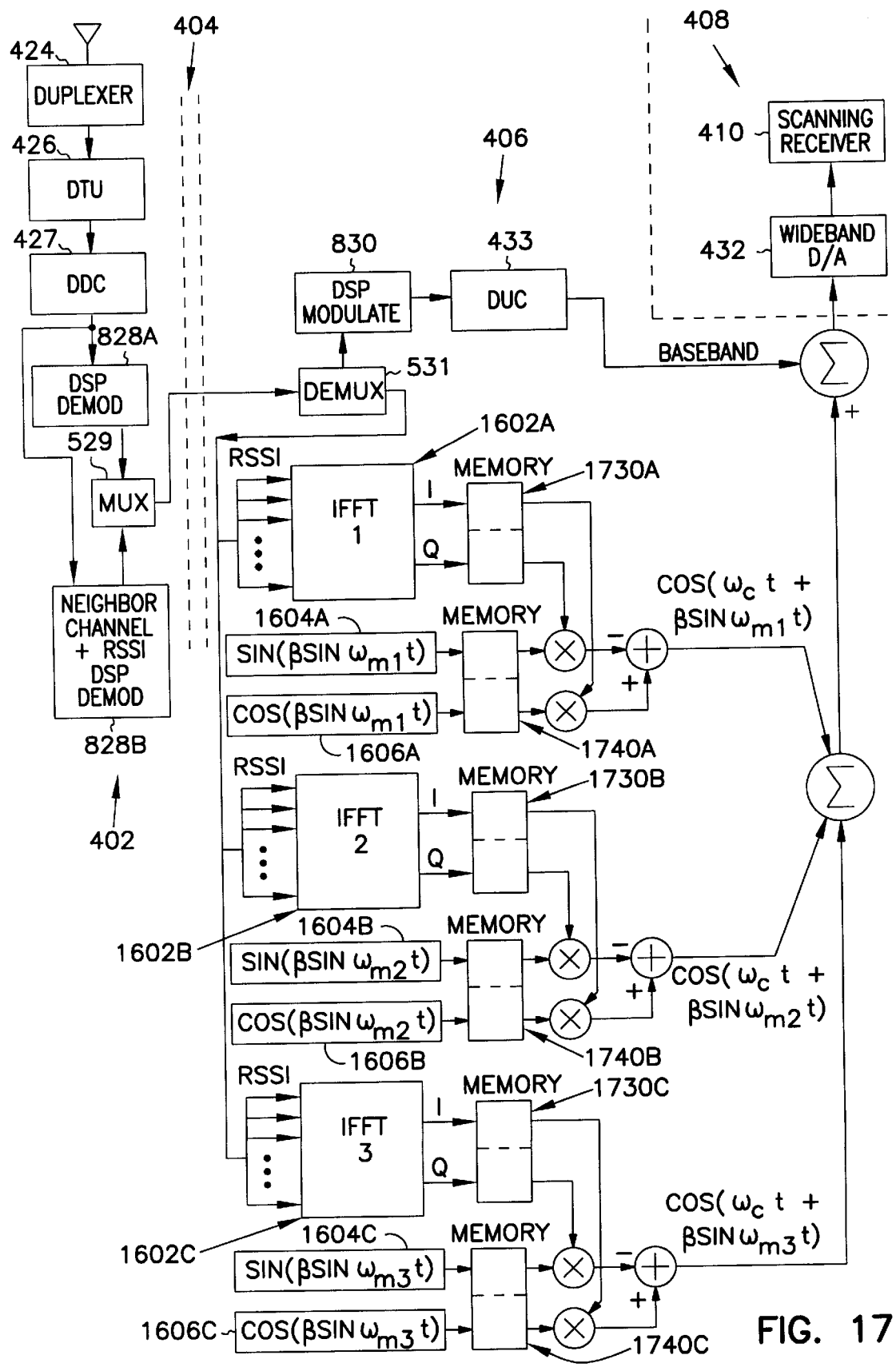
FIG. 17 is a block diagram of a communication system employing the SAT frequency modulation system of FIG. 16.

FIG. 17 shows a block diagram of a system having circulating memories for providing the time domain RSSI information and the necessary components of the analytic zero Hertz carrier according to one embodiment of the present invention. The Hilbert Transform Filter is not necessary, since the positive frequency only transform is implemented. Further, this system operates at Fs, since a complex approach is taken as described above. In one embodiment, tabularized RSSI level information and SAT frequency information are sent over T1 line 404 and received at host unit 406 to be demodulated by demodulator 531. The baseband information on M channels is sent to DSP modulator 830 and upconverted for summation to create a version of the original broadband signal for scanning receiver 410. The RSSI level information is sent by demodulator 531 to IFFTs 1602A–C, based on the SAT frequency associated with the RSSI level information. In this embodiment, memories 1730A–C circularly provide the time domain RSSI information for mixing with the $\text{Sin}(\beta\,\text{Sin}(\omega_m t))$ and $\text{Cos}(\beta\,\text{Sin}(\omega_m t))$ components for each SAT frequency. The $\text{Sin}(\beta\,\text{Sin}(\omega_m t))$ and $\text{Cos}(\beta\,\text{Sin}(\omega_m t))$ components for each SAT frequency are circularly provided by memories 1740A–C, respectively. As described above, in an alternate embodiment, a single table of the needed Sin and Cos samples may be stored and accessed as needed, since the Sin and Cos components are only ninety degrees out of phase. Furthermore, in one embodiment the $\text{Sin}(\beta\,\text{Sin}(\omega_m t))$ and $\text{Cos}(\beta\,\text{Sin}(\omega_m t))$ components need only be calculated once, and the IFFT outputs are calculated about as often as the scanning receiver 410 processes RSSI level information. In other embodiments, the IFFT outputs are calculated at different rates without departing from the scope and spirit of the present invention.

Systems have been described which reproduce carriers that are centered exactly on the frequency bins of the IFFT input. This is useful to preserve the simplicity of the IFFT input, and to maintain continuity at the endpoints of the time domain waveform. The ability to reproduce carriers at the correct frequency is thus limited by the resolution of the N-point IFFT. For example, at a 30.72 MHz sample rate, the resolution is 30 kHz for N=1024, 15 kHz for N=2048, etc. (The FFT algorithm requires N to be a power of 2).

While any resolution better than 30 kHz is sufficient to match the 30 kHz channel spacing in the AMPS cellular band, there is the possibility that the frequency of the local oscillator used to upconvert the carriers from baseband to RF will result in all the carriers being offset from the desired locations by a fixed amount. While the resolution can always be doubled by doubling N, this presents a burden on the computational and storage requirements of the DSP. A system for correcting frequency offset without arbitrarily increasing N is described herein.

With reference to FIG. 16, a frequency shift is introduced into the SAT modulation waveforms (1604 and 1606) by replacing $\text{Sin}(\beta\,\text{Sin}(\omega_m t))$ and $\text{Cos}(\beta\,\text{Sin}(\omega_m t))$ with $\text{Sin}(\omega_s t+\omega\beta\,\text{Sin}(\omega_m t))$ and $\text{Cos}(\omega_s t+\omega\beta\,\text{Sin}(\omega_m t))$, respectively, where $\omega_s$ is the desired frequency shift. The output of the algorithm in FIG. 16 then becomes $\text{Cos}[(\omega_s+\omega_c)t+\beta\,\text{Sin}(\omega_m t)]$, where $\omega_c$ is the closest estimate of the desired carrier frequency allowed by the resolution of the IFFT, and $\omega_s$ is the amount of frequency shift needed to move the carrier closer to the actual desired frequency.

The resulting modulating waveform (1604' and 1606') now has two frequency components ($\omega_m$ and $\omega_s$), which may substantially increase the amount of memory needed to store a repeating portion of that waveform. However, if $\omega_s=n\times\omega_m$, where n is an integer, then the waveform will repeat in one $\omega_m$ period, and the memory requirements are not affected. On the other hand, for example, frequency shifts of $n\times\frac{1}{2}\omega_m$, where n is an odd integer, would double memory requirements.

As an example, an N=1024 IFFT may result in carriers which fall 10 kHz below the desired frequency locations. Incorporating a frequency shift of $\omega_s=2\times\omega_m$ (a shift of 12 kHz, for a SAT of 6000 Hz) reduces the net error to approximately 2 kHz. As another example, an N=2048 IFFT may result in carriers which fall 5 kHz above the desired locations. Incorporating a frequency shift of $\omega_s=-1\times\omega_m$ (a shift of −6 kHz for a SAT of 6000 Hz) reduces the net error to approximately −1 kHz.

The description of embodiments herein is not limited to a three SAT frequency system. Other embodiments incorporating different numbers of SAT frequencies may be constructed using the teachings presented herein, and these embodiments do not depart from the scope and spirit of the present invention.

The invention(s) has been described in detail, and those of skill in the art will recognize that many modifications and changes may be made thereto without departing from the spirit and the scope of the present invention. For example, the sampling rates and structures may differ without departing from the present invention. Furthermore, the embodiments described herein are not intended in an exclusive or limiting sense, and that the invention is as claimed in the following claims and their equivalents.

What is claimed is:

1. A method for communicating in a cellular network, the cellular network including one or more remote cells and a host unit, the method comprising the steps of:

transmitting messages over a telephone line, the messages comprising baseband signals and received signal strength indication levels for each channel of a particular remote unit, the messages further comprising received signal strength indication levels for one or more channels of one or more neighboring remote units, the messages identifying an associated supervisory audio tone frequency for each channel; and at the host unit, constructing a broadband signal recognizable by a scanning receiver, the broadband signal including:

for each channel of the particular remote cell, a carrier modulated by the baseband signals and the supervisory audio tone frequency, and scaled by its associated received signal strength indication level; and for each channel of neighboring cells, a carrier modulated by the supervisory audio tone frequency, scaled by its associated received signal strength indication level;

where the step of constructing includes the steps of:

performing a separate transform on the associated received signal strength indication levels for each supervisory audio tone frequency to generate associated time domain received signal strength indication weighted carriers;

for each supervisory audio tone frequency, modulating a carrier having a frequency related to the supervisory audio tone frequency with the associated time domain received signal strength indication weighted carriers to generate a set of supervisory audio tone modulated signals; and combining the modulated signals corresponding to each supervisory audio tone frequency with the baseband signals to construct the broadband signal.

2. The method of claim 1, where the step of performing a separate transform further comprises the step of:

generating a separate inverse Fourier transform on a positive frequency representation of the associated received signal strength indication levels for each supervisory audio tone frequency to generate the associated time domain received signal strength indication weighted carriers.

3. The method of claim 2, where the positive frequency representation is generated by zero padding the input to the separate inverse Fourier transforms above the N/2 position.

4. The method of claim 2 further comprising the step of storing the associated time domain received signal strength indication weighted carriers in a memory.

5. The method of claim 1, where the step of modulating further comprises the steps of, for each supervisory audio tone frequency:

synthesizing a complex signal, $e^{jx}$, where x is a tone with frequency approximately equal to a frequency of the supervisory audio tone frequency, to generate a complex representation of a frequency modulated zero hertz signal; and mixing the complex representation with the associated time domain received signal strength indication weighted carriers to generate a modulated signal.

6. The method of claim 5, where the step of synthesizing comprises the steps of:

generating a real component and an imaginary component of the complex representation; and storing the real component and the imaginary component in a memory.

7. The method of claim 1, where the step of performing a separate transform further comprises the steps of:

generating a separate inverse Fourier transform on a positive frequency representation of the associated received signal strength indication levels for each supervisory audio tone frequency to generate the associated time domain received signal strength indication weighted carriers; and storing the associated time domain received signal strength indication weighted carriers in a memory;

where the step of modulating further comprises the steps of, for each supervisory audio tone frequency:

synthesizing a complex signal, $e^{jx}$, where x is a tone with frequency approximately equal to a frequency of the supervisory audio tone frequency, to generate a complex representation of a frequency modulated zero hertz signal; and mixing the complex representation with the associated time domain received signal strength indication weighted carriers to generate a modulated signal.

8. The method of claim 7, where the time domain received signal strength indication weighted carriers are stored in memory in separate imaginary and real components, and the complex representation is stored in memory in separate imaginary and real components, and where the step of mixing comprises the steps of:

multiplying the real components of the received signal strength indication levels and of the complex representation to create a first result;

multiplying the imaginary components of the received signal strength indication levels and of the complex representation to create a second result;

subtracting the second result from the first result to yield the modulated signal.

9. The method of claim 8, where the received signal strength indication levels are processed at a rate approximately equal to a rate at which the scanning receiver reads received signal strength indication information.

10. The method of claim 8, where the complex representation is calculated once.

11. The method of claim 9, where the complex representation real and imaginary components are generated from one coefficient table.

12. The method of claim 7, further comprising the steps of:

generating a modulated signal for each supervisory audio tone frequency;

adding each modulated signal to a baseband signal to construct the broadband signal.

13. The method of claim 8, where the memory is a RAM.

14. The method of claim 8, where the memory is a FIFO buffer.

15. The method of claim 7, where the time domain received signal strength indication weighted carriers are stored in memory in separate imaginary and real components, and the complex representation is stored in memory in $\cos(\beta \sin(\omega_m t))$ and $\sin(\beta \sin(\omega_m t))$ components, and where the step of mixing comprises the steps of:

multiplying the real component of the received signal strength indication levels and the $\cos(\beta \sin(\omega_m t))$ component to create a first result;

multiplying the imaginary component of the received signal strength indication levels and the $\sin(\beta \sin(\omega_m t))$ component to create a second result;

subtracting the second result from the first result to yield the modulated signal.

16. The method of claim 7, where the time domain received signal strength indication weighted carriers are stored in memory in separate imaginary and real components, and the complex representation is stored in memory in $\cos(\omega_s t + \omega\beta \sin(\omega_m t))$ and $\sin(\omega_s t + \omega\beta \sin(\omega_m t))$ components, and where the step of mixing comprises the steps of:

multiplying the real component of the received signal strength indication levels and the $\cos(\omega_s t + \omega\beta \sin(\omega_m t))$ component to create a first result;

multiplying the imaginary component of the received signal strength indication levels and the $\sin(\omega_s t + \omega\beta \sin(\omega_m t))$ component to create a second result;

subtracting the second result from the first result to yield the modulated signal, where $\omega_s$ is a frequency shift to offset to a desired frequency.

17. A communications system, comprising:

a base station connected to a host unit, the host unit connected to a scanning receiver; and one or more remote units, connected to the host unit over a telephone line, the remote units transmitting tabularized received signal strength indication levels and supervisory audio tone frequency information;

where the host unit processes the tabularized received signal strength indication levels and supervisory audio tone signalling information to generate a broadband signal for the scanning receiver;

where the host unit comprises frequency domain to time domain convertors and modulators for generating the broadband signal from the tabularized received signal strength indication levels and supervisory audio tone signalling information.

18. A communications system, comprising:

a base station connected to a host unit, the host unit connected to a scanning receiver; and one or more remote units, connected to the host unit over a telephone line, the remote units transmitting tabularized received signal strength indication levels and supervisory audio tone frequency information;

where the host unit processes the tabularized received signal strength indication levels and supervisory audio tone signalling information to generate a broadband signal for the scanning receiver; and where the host unit comprises a digital signal processor for generating a complex signal, modulating the complex analog signal with a particular supervisory audio tone frequency, and signal addition means for adding signals to construct the broadband signal.

19. The communications system of claim 17, where the host unit comprises one or more memories for storing components used in generating the broadband signal.

20. A communications system, comprising:

a Hilbert transform filter; and a base station connected to a host unit, the host unit connected to a scanning receiver; and one or more remote units, connected to the host unit over a telephone line, the remote units transmitting tabularized received signal strength indication levels and supervisory audio tone frequency information, where the host unit processes the tabularized received signal strength indication levels and supervisory audio tone signalling information to generate a broadband signal for the scanning receiver.

21. A communications system, comprising:

a host unit, connected to a scanning receiver, the host unit processing received signal strength indication levels and supervisory audio tone signalling information to generate a broadband signal for the scanning receiver, and where the host unit comprises frequency domain to time domain convertors and modulators for generating the broadband signal from the received signal strength indication levels and supervisory audio tone signalling information.

22. A communications system, comprising:

a host unit, connected to a scanning receiver, the host unit processing received signal strength indication levels and supervisory audio tone signalling information to generate a broadband signal for the scanning receiver, and where the host unit comprises a digital signal processor for generating a complex signal, modulating the complex analog signal with a particular supervisory audio tone frequency, and signal addition means for adding signals to construct the broadband signal.

23. The communications system of claim 21, where the host unit comprises one or more memories for storing components used in generating the broadband signal.

24. A communications system, comprising:

a host unit, connected to a scanning receiver, the host unit processing received signal strength indication levels and supervisory audio tone signalling information to generate a broadband signal for the scanning receiver; and a Hilbert transform filter.

* * * * *

UNITED STATES PATENT AND TRADEMARK OFFICE
CERTIFICATE OF CORRECTION

PATENT NO. : 6,112,086
APPLICATION NO. : 08/805802
DATED : August 29, 2000
INVENTOR(S) : Wala It is certified that error appears in the above-identified patent and that said Letters Patent is hereby corrected as shown below:

At Column 2, line 39, please replace "antennas sites" with --antenna sites--.

At Column 2, line 44, please replace "network 26" with --network 42--.

At Column 2, line 44, please replace "antennas sites 22" with --antenna sites 40--.

At Column 2, lines 44-45, please replace "detector circuit 27" with --detector circuit--.

At Column 2, lines 46, please replace "antenna site 22" with --antenna site 40--.

At Column 2, line 48, please replace "antenna sites 22" with --antenna sites 40--.

At Column 2, lines 48-49, please replace "microcell area 21" with --microcell area 50--.

At Column 2, line 49, please replace "antenna sites 22" with --antenna sites 40--.

At Column 2, line 51, please replace "network 26" with --network 42--.

At Column 2, line 51, please replace "base station 25" with --base station 44--.

At Column 2, line 52, please replace "base station 25" with --base station 44--.

At Column 2, line 53, please replace "antenna sites 22" with --antenna sites 40--.

At Column 2, line 54, please replace "base station 25" with --base station 44--.

UNITED STATES PATENT AND TRADEMARK OFFICE
CERTIFICATE OF CORRECTION

PATENT NO. : 6,112,086
APPLICATION NO. : 08/805802
DATED : August 29, 2000
INVENTOR(S) : Wala It is certified that error appears in the above-identified patent and that said Letters Patent is hereby corrected as shown below:

At Column 2, line 55, please replace "microcell 21" with --microcell area 50--.

At Column 2, line 56, please replace "base station 25" with --base station 44--.

At Column 9, line 3, please replace "multiplexor" with --multiplexer--.

At Column 12, line 2, please replace "convertor" with --converter--.

At Column 12, line 49, please replace "Mhz" with --MHz--.

At Column 13, line 67, please replace "demodulated by demodulator 531" with --demultiplexed by demultiplexer 531--.

At Column 14, lines 4-5, please replace "demodulator 531" with --demultiplexer 531--.

Signed and Sealed this

Twenty-fifth Day of December, 2007

JON W. DUDAS
*Director of the United States Patent and Trademark Office*